US012105973B2

(12) United States Patent
Kachare et al.

(10) Patent No.: US 12,105,973 B2
(45) Date of Patent: Oct. 1, 2024

(54) DYNAMIC QUANTIZATION IN STORAGE DEVICES USING MACHINE LEARNING

(71) Applicant: Samsung Electronics Co., Ltd., Suwon-si (KR)

(72) Inventors: Ramdas P. Kachare, Pleasanton, CA (US); Manali Sharma, Santa Clara, CA (US); Praveen Krishnamoorthy, Santa Clara, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 9 days.

(21) Appl. No.: 16/875,981

(22) Filed: May 15, 2020

(65) Prior Publication Data

US 2021/0303156 A1 Sep. 30, 2021

Related U.S. Application Data

(60) Provisional application No. 62/994,820, filed on Mar. 25, 2020.

(51) Int. Cl.
*G06F 3/06* (2006.01)
*G06N 20/00* (2019.01)

(52) U.S. Cl.
CPC ............ *G06F 3/064* (2013.01); *G06F 3/0608* (2013.01); *G06F 3/0673* (2013.01); *G06N 20/00* (2019.01)

(58) Field of Classification Search
CPC ...... G06N 20/00; G06N 99/005; G06N 3/088; G06F 3/0601; G06F 3/0614; G06F 3/064; G06F 3/0673; G06F 3/0608; G06F 3/0641; G06F 3/0679; G06F 3/0655; G06F 3/0604; G06F 3/061; G06F 3/0653; G06F 12/0246; G06F 12/109
See application file for complete search history.

(56) References Cited

U.S. PATENT DOCUMENTS 8,200,640 B2 6/2012 Arasu et al.
8,346,736 B2 1/2013 Haustein et al.
8,364,716 B2 1/2013 Gaonkar et al.
9,275,067 B2 3/2016 Bates et al.
9,336,092 B1 5/2016 Li
9,569,700 B1 * 2/2017 Santos .................. G06N 3/045
(Continued)

FOREIGN PATENT DOCUMENTS

CN 1509107 A * 6/2004
KR 20070048892 A * 5/2007 ....... G06F 17/30722
WO WO-2016123383 A2 * 8/2016 ......... G06F 16/1752

OTHER PUBLICATIONS

Qinlu He, Zhanhuai Li and Xiao Zhang, "Data deduplication techniques," 2010 International Conference on Future Information Technology and Management Engineering, 2010, pp. 430-433, doi: 10.1109/FITME.2010.5656539. (Year: 2010).*
(Continued)

*Primary Examiner* — Michael Krofcheck
(74) *Attorney, Agent, or Firm* — Renaissance IP Law Group LLP

(57) ABSTRACT

A storage device may include storage for data. A host interface may receive a write request from a host at the storage device. The write request may include a data chunk and a data identifier (ID). A class ID determiner circuitry may determine a class ID for the data chunk. A mapping table may map the data ID to the class ID.

22 Claims, 12 Drawing Sheets

(56) References Cited

U.S. PATENT DOCUMENTS

2003/0103392 A1* 6/2003 Matsushita ............ G11C 16/06 365/200
2010/0250501 A1 9/2010 Mandagere et al.
2011/0055471 A1* 3/2011 Thatcher ............... G06F 3/0608 711/114
2011/0238635 A1* 9/2011 Leppard .............. G06F 16/1752 707/693
2012/0016845 A1 1/2012 Bates
2012/0158709 A1* 6/2012 Gaonkar ............... G06F 16/214 707/723
2013/0086006 A1* 4/2013 Colgrove ............ G06F 16/1752 707/692
2013/0086460 A1* 4/2013 Folting ..................... G06F 9/44 715/212
2013/0268497 A1 10/2013 Baldwin et al.
2014/0244553 A1* 8/2014 Sega ...................... G06N 20/00 706/12
2015/0019833 A1* 1/2015 Aronovich ............ G06F 3/0629 711/171
2015/0309880 A1 10/2015 Gonzalez et al.
2015/0347445 A1 12/2015 Zhu
2015/0379425 A1* 12/2015 Dirac ..................... G06N 20/00 706/12
2016/0018990 A1* 1/2016 Yun ....................... G06F 3/0685 711/103
2016/0110107 A1* 4/2016 Zhang ..................... G06F 3/064 711/103
2016/0139817 A1* 5/2016 Harijono ............... G06F 3/0641 711/154
2018/0367161 A1* 12/2018 Ki ........................... G06F 3/064
2019/0034449 A1* 1/2019 Zhang ................. G06F 13/1668
2019/0121564 A1* 4/2019 Guim Bernat ........ G06F 3/0619
2019/0124488 A1* 4/2019 Ellis ........................ H04W 4/38
2019/0199520 A1* 6/2019 Kim ........................ H04L 9/088
2019/0236076 A1* 8/2019 Kondo .............. G06F 16/24552
2019/0320022 A1* 10/2019 Raghunath ............ H04L 67/101
2020/0133849 A1* 4/2020 Harris ................. G06F 12/0246
2020/0233603 A1* 7/2020 Yoshida ................ G06F 3/0611
2020/0264943 A1* 8/2020 Tsern .................. G06F 11/0745
2020/0409856 A1* 12/2020 Navon ................ G06F 11/3037
2021/0182206 A1* 6/2021 Raasch ............... G06F 11/0772
2021/0286537 A1* 9/2021 Shveidel ................. G06F 3/061

OTHER PUBLICATIONS

European Office Action for Application No. 21164983.5, mailed Mar. 1, 2023.
European Extended Search Report for Application No. 21164983.5, mailed Jun. 28, 2024.

* cited by examiner

425

Flash Translation Layer

505

| LBA-Class ID | | | |
|---|---|---|---|
| LBA | Class ID | Classifier ID | Params. |
| 0x1000 | 101 | 1 | |
| 0x1001 | 101 | 1 | |
| 0x1002 | 201 | 1 | |
| 0x1003 | 201 | 2 | |
| ⋮ | | | |

510

| Class ID-PBA | | | |
|---|---|---|---|
| Class ID | Classifier ID | PBA | Params. |
| 101 | 1 | 0x1100 | Policy 1 |
| 201 | 1 | 0x1101 | Policy 2 |
| 201 | 2 | 0x1102 | Policy 3 |
| ⋮ | | | |

FIG. 5

DYNAMIC QUANTIZATION IN STORAGE DEVICES USING MACHINE LEARNING

RELATED APPLICATION DATA

This application claims the benefit of U.S. Provisional Patent Application Ser. No. 62/994,820, filed Mar. 25, 2020, which is incorporated by reference herein for all purposes.

FIELD

The inventive concepts relate generally to storage devices, and more particularly to increasing the effective storage capacity of storage devices by storing data at less than full fidelity.

BACKGROUND

In Information Technology (IT) infrastructures, large amounts of data are being generated by various devices and processes. Some examples of these data generators include, but are not be limited to, smart machines, autonomous vehicles, social networks, and Internet of Things (IoT) devices. Artificial Intelligence (AI) and Machine Learning (ML) algorithms are being developed to analyze collected data and use the data to achieve greater efficiency and productivity in various applications. Such large quantities of data may be stored in high-performance, reliable storage systems consisting of Solid State Drives (SSDs), Hard Disk Drives (HDDs), storage nodes, and storage interconnects.

SSDs use Not AND (NAND) flash media to persistently store the data. The flash media enables a high-performance data access using parallel flash channel interface. Host interface protocols such as Non-Volatile Memory Express (NVMe) and NVMe over Fabrics (NVMe-oF) may be used so that the flash media performance and other advantages are provided to the host.

But the sheer amount of data being generated requires significant numbers of storage devices to store the data. As the amount of data being stored increases, the number of storage devices needed to store that data also increases. In addition, data may be stored at full fidelity, with each data being stored independently of any other. Data deduplication may eliminate redundant copies of the same data, but if there is any variation between two data sets data deduplication may not be optimally performed.

A need remains for a storage device that may increase its effective storage capacity without necessarily adding additional actual storage capacity.

BRIEF DESCRIPTION OF THE DRAWINGS

FIG. 5 shows details of the flash translation layer of FIG. 4.

DETAILED DESCRIPTION

Figure 1:
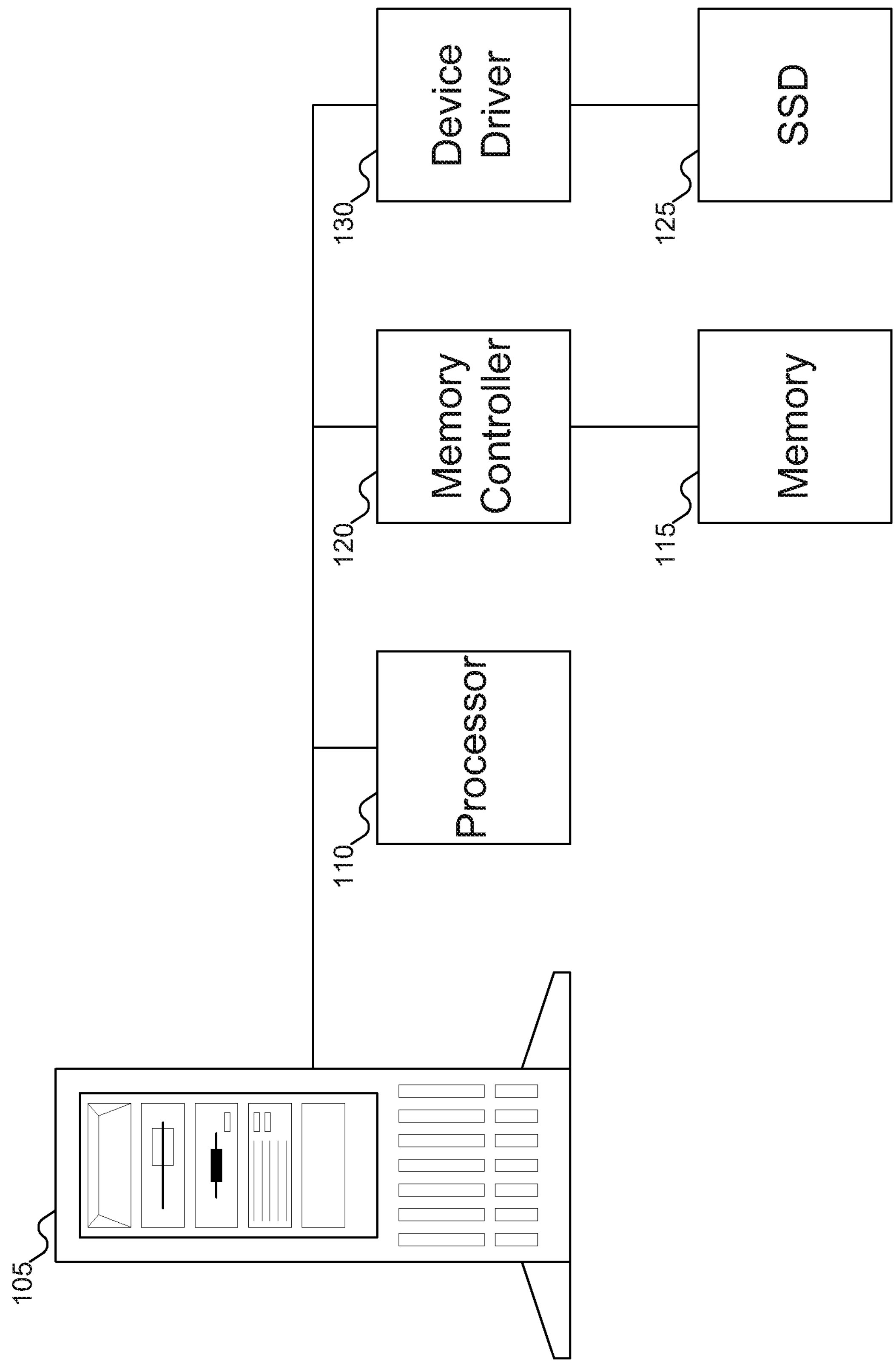
FIG. 1 shows a machine including a lossy storage device, according to an embodiment of the inventive concept.

Reference will now be made in detail to embodiments of the invention, examples of which are illustrated in the accompanying drawings. In the following detailed description, numerous specific details are set forth to enable a thorough understanding of the invention. It should be understood, however, that persons having ordinary skill in the art may practice the invention without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the invention.

The terminology used in the description of the invention herein is for the purpose of describing particular embodiments only and is not intended to be limiting of the invention. As used in the description of the invention and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Vast quantities of data are being generated by social networks, Internet of Things (IOT) applications, smart machines, and Machine Learning (ML)/Artificial Intelligence (AI) systems. Such very large amount of data require cost-efficient persistent storage. Some applications that generate such data may tolerate data loss in the form of lower precision or fidelity of collected data.

Embodiments of the inventive concept include an architecture that may increase the persistent data storage capacity of a storage device (e.g., a solid state drive, SSD) or other storage device using lossy storage. The basic idea is to store an approximation of multiple closely-related datasets.

Embodiments of the inventive concept may use a neural network-based technique to classify the input datasets into unique buckets or clusters. For each such bucket or cluster, the SSD may store one representative dataset. When the host performs reads to any of the datasets belonging to a cluster or bucket, the stored single representative dataset may be returned to the host. This technique may reduce the amount of capacity needed and provides a large storage capacity to the applications. For storage of the representative dataset, various techniques can be used, such as storing the first dataset, the last dataset, or a weighted average of the datasets in each cluster. For classifying the input datasets into different clusters or buckets, various neural network (NN) architectures such as multilayer perceptron (MLP), recurrent neural network (RNN), and convolutional neural network (CNN) may be used.

Increasing the persistent data storage capacity of a SSD using lossy storage may be suitable for applications that can tolerate data loss in the form of lower precision or fidelity: e.g., ML applications. Dynamic quantization methods may be used to store an approximation of multiple closely-related data-chunks (which is different from conventional data deduplication), thereby increasing the storage capacity of an SSD. Quantizing the data may be performed, for example, using neural network and similarity/distance functions. Embodiments of the inventive concept may use different classifiers (e.g., different NNs) for different or specific dataset types. For example, there may be one classifier to support video data, one to support IoT sensor data, or one for each type of data, such as audio, image, text, PDF, etc.

Embodiments of the inventive concept may also enable configuring the accuracy levels, thereby variably increasing the storage capacity of the SSD.

Embodiments of the inventive concept may be used with either block storage (LBA-based) or object storage (Key-Value (KV) SSD).

The association between Class ID and the host side address (LBA)/key may be stored in the address translation table, potentially along with identifier of the NN used for storing that dataset.

DETAILED DESCRIPTION OF INVENTION

Dynamic Quantization in Storage Devices Using Machine Learning

Traditional storage devices are lossless in nature. That is to say, user data stored in the SSD (or other storage device) is guaranteed to be reproduced when needed with high accuracy.

There is no loss in fidelity of the stored data. The SSD may compress the data before persistence, but the compression technique is guaranteed to be a lossless one. In general, these conditions mean that the capacity of a SSD is finite and can only store data up to the physical media capacity.

Embodiments of the inventive concept may use a different method to persist user data. When a host writes user data to the SSD, that data may be first divided into a suitable chunk size, such as about 4 KB or about 8 KB. The chunk size may be consistent with the host indicated Logical Block (LB) (or sector size), or it may vary from the LB/sector size. Typical sector or block sizes include about 512 B, about 4 KB, about 8 KB, etc.: embodiments of the inventive concept may support other sector or block sizes as well. Each sector or logical block may be addressed by Logical Block Address (LBA). That is to say, the host may use the LBA to refer to the data that an SSD stores persistently. The SSD, on the other hand, may maintain a logical to physical block address (PBA) translation or mapping. When the host writes data, the SSD may store the user data into the flash media and may update the LBA to PBA, which may also be stored persistently. When the host reads data, the SSD may look up the LBA to PBA translation table, fetch the data from the flash media using physical address, and return that data to the host.

In the proposed storage method, similar data chunks are treated as a single dataset for storage purpose. That is to say, when multiple host datasets closely resemble to each other, only one copy for those datasets is actually stored. This technique can significantly reduce the amount of data stored. This benefit may be especially true if the user data has a lot of similarity among the various chunks of data. Subsequent sections describe various methods to measure the similarity in terms of distance between two datasets.

Each input dataset is assigned a Class ID, also known as a bucket ID or cluster ID. This Class ID may then be stored in a table against LBA and PBA. For each Class ID, only one dataset may be stored. The stored dataset may be the first dataset received for that class or it may be the last dataset. Another possibility is to update the stored dataset of a given class every time an input dataset is classified into the corresponding class.

When the host needs the stored data, the host may present the LBA to the SSD. The SSD may then look up the LBA to get Class ID. The SSD may then use the Class ID to lookup the PBA of the dataset stored for that class. Using the PBA, the SSD may retrieve the dataset and return it to the host. The data returned may not exactly match the original data written by the host for that LBA, but embodiments of the inventive concept may be used only for applications that may tolerate some data loss or lack of full fidelity of the stored data. Applications that expect lossless data storage may cluster only the exact duplicate data chunks into a group or cluster.

This architecture note uses block storage (LBA-based) as an example for host communication with SSD. But the concepts and ideas described here are also equally applicable to object storage such as Key Value (KV) storage. The concepts are independent of any transport layers and host protocols used by the host and SSD such as Peripheral Component Interconnect Express (PCIe), Ethernet, Remote Direct Memory Access (RDMA), Transmission Control Protocol/Internet Protocol (TCP/IP), Fiber Channel, Serial Attached Small Computer System Interface (SCSI) (SAS), Serial AT Attachment (SATA), Non-Volatile Memory Express (NVMe), and NVMe over Fabric (NVMe-oF), among others.

Based on the degree of similarity present in the user data, embodiments of the inventive concept may provide significant increase in the effective data storage capacity for certain applications by using limited amount of physical flash media capacity. One example of such use case is video monitoring: the monitored scene may not change much, and hence the gathered data may contain a high degree of similarity between various data chunks. Another example could be storage of images for Artificial Intelligence (AI)/Machine Learning (ML) analytics: many images may contain similar scene features such as sky, or mountains, trees, or ocean. Since those images are broken into chunks that may be classified into buckets or classes using similarity measures, a significant data reduction can be achieved. Many similar use cases can be devised especially for unstructured data applications.

Embodiments of the inventive concept may be suitable for unstructured data and applications that can tolerate some loss of data fidelity. There may be applications that may not need exact reproduction of the stored data. For example, a camera may store the images that it recorded. Later, a security application may read and analyze those images; but an approximation of the original images may suffice. There can be many such applications, particularly in the area of analysis of unstructured data.

The host interface layer (HIL) is pretty much same as the one in a conventional SSD. It provides a logical interface to the host for accessing stored data. It extracts the various host inputs such as data, LBA, Key, Value, etc. as applicable based on the type of interface.

The host input dataset may be segmented into data chunks of configured size. The data chunk may match the sector or block size if the block interface is being used. Some example data chunk sizes are about 512 bytes, about 4 KB, or about 8 KB. Each data chunk may then be fed into one or more classifier neural networks (NNs). The output of the classifier NNs may essentially be the internal "key" or "handle", called the Class ID, of the data being stored. The Class ID may be associated with the corresponding LBA, if present; in the case of KV host interface, the Class ID may be returned to the host as Key for the put value. The association between Class ID and the host side address/key/handle may be stored in the address translation table along with the identifier of the NN used for storing that dataset.

The host input dataset may contain some form of the "data type", e.g., file extension or metadata. The host provided data type may be used to select different/appropriate NNs to be used for that dataset. One example of data type usage is to distinguish between different data sources. For example, different data type values can be used for camera output data and say, the sensor data.

Once classification of the data chunk into clusters or groups is performed, the address translation table may be updated with the mapping of LBA/Key etc. as the host address and the corresponding Class ID. If the host operation is Write and the Class ID does not already exist in the translation table, the data chunk may be persisted to the flash media and the associated Physical Block address (PBA) may be updated in the translation table. If the Class ID already exists in the mapping table, various Write data update polices can be applied. In one embodiment of the inventive concept, the data chunk may be persisted only at the first instance. In another embodiment of the inventive concept, the latest data chunk of a Class ID may be persisted, overwriting the previous data chunk of that Class ID. In yet another embodiment of the inventive concept, the current data chunk may be used to create a weighted average of the current values and the existing data chunk values.

When the host operation is Read, the host may present a logical address of the dataset such as LBA or KV Key. The host LBA or KV Key may be used to look up the physical address of the data chunk in the mapping table. Using the physical address, the data chunk may be retrieved from the flash media and returned to the host.

The proposed method may use a quantization function or a clustering function. Datasets that are close to a certain extent may be grouped together into one class or bucket, and a single representative dataset is chosen to represent that class or bucket. This grouping may enable a significant reduction in the physical storage capacity, at the cost of approximation of the data. The length of the host data may be preserved, but the values of the dataset may not exactly match the original values. In other words, the stored data may suffer loss in terms of accuracy or the fidelity of the values, and as long as the user application can tolerate such loss, far greater storage capacity can be offered at lower cost.

As host data is written to the SSD, weights and parameters of the classifier NNs in the SSD may be changed. The changed NN parameters may be periodically persisted to the flash media using Flash Interface. Most of the Flash Interface functions described earlier in the conventional SSD section remain the same. The state of the NNs itself may be compressed using a lossless technique. The state of the NNs may be encrypted for security protection as well as protected against any physical media error using error detection and correction codes such as low density parity check (LDPC) or Bose-Chaudhuri-Hocquenghem (BCH) codes.

Approaches for Dataset Quantization

The datasets may be quantized by using simple data similarity functions or distance measures, such as cosine similarity or Euclidean distance, or by using neural networks to cluster similar data chunks into same group or Class ID. The neural network approaches to cluster the datasets may be supervised, semi-supervised, or unsupervised. The system may incorporate various NNs: e.g., one NN for each type of data, such as image, text, PDF, etc. For images, the dataset may be first divided into RGB (Red, Blue, and Green) channels and then quantized/clustered into various Class IDs. Since only one data set for each Class ID may be stored, some of the data chunks may be lost, and hence the clustering algorithms may need to be updated using incremental machine learning or an online machine learning: e.g., by using mini-batch K-Means clustering algorithm. When the datasets are quantized using similarity/distance functions, the dataset stored for a given Class ID may be the first dataset, last dataset, or weighted average of all data chunks for a given Class ID. When the datasets are quantized using neural networks or clustering algorithms, the data chunk stored for a particular cluster or Class ID may be the centroid of each cluster as determined by the clustering algorithm. The system may use a combination of neural networks and similarity functions. For example, given several datasets, the datasets may be categorized into different clusters or Class IDs, and then within each cluster or Class ID, the datasets may be divided into different chunks which are further categorized into various Class IDs using similarity/distance functions.

Classify NN Architecture

The neural network architectures to perform clustering using unsupervised learning approaches may include autoencoders, deep neural networks with clustering loss functions, self-organizing map (SOM) neural networks, Generative Adversarial Networks (GANs), variational autoencoders, and ClusterNet, among other possibilities. Moreover, the neural networks may be used to learn representations of data that may be further used for clustering or categorizing the data chunks into various Class IDs.

Persistence Functions

When the host performs a Write operation, a single copy of the write data may be persisted for a group of similar datasets. There are several ways to persist the write data. Examples include: the first dataset is written for each Class ID; the last dataset is written for each Class ID; a weighted average of the write datasets is written for each Class ID, and the centroid of the write datasets, as determined by the NN or clustering algorithm, is written for each Class ID.

In one embodiment of the inventive concept, only the first dataset for a given Class ID is persisted. This option may be exercised when the host performs a write operation, and the corresponding write data leads to a Class ID which does not exist in the LBA—Class ID table. All subsequent host writes that result in the same Class ID may be essentially ignored or thrown away. That is to say, for any subsequent read operations of LBAs that correspond to the Class ID, only the original or the first write data is returned. In other words, only the first dataset of a Class ID is remembered.

In another embodiment of the inventive concept, every time the host performs a write operation, the write data is always written to the corresponding Class-ID. Basically, when a new write operation maps to an existing Class ID, the old data for that Class ID is replaced with the latest data. In other words, only the last dataset of a Class ID is remembered, and all previous data corresponding to that Class ID is lost.

In yet another embodiment of the inventive concept, a weighted function of the new and old data corresponding to a Class ID is used for persistence operation. For example:

$$\text{Write Data}=\text{Current Data Chunk}*\text{Weight}+\text{Earlier Data Chunk}*(1-\text{Weight})$$

In yet another embodiment of the inventive concept, the centroid of the datasets within each Class ID may be persisted into the SSD.

Dataset Granularity

This architecture may use byte granularity of the dataset for classification purpose. But it is possible to use other values such as 1-bit granularity, or 16-bit granularity, or 10-bit granularity, etc. Different dataset granularities may provide benefits or trade-offs based on the type of data. That is to say, it may be possible to use multiple/different dataset granularities in the proposed SSD that may be relevant for different applications and their unique data types and/or characteristics.

Storage Capacity Analysis

The amount of increase in the effective storage of the SSD may relate to the number of data chunks the SSD may store and the level of similarity between data chunks. For example, a storage device might have an available storage capacity of 1 TB (ignoring overprovisioning), using data chunks of 4 KB. Such a storage device would include 268,435,456 data chunks. If data chunks include a 25% similarity, then the storage device is effectively capable of storing 335,544,320 data chunks, or approximately 1.25 TB. (There is some overhead associated with storing the mapping from LBA to class ID and from class ID to PBA, but this overhead amounts to less than 1% of the actual storage capacity of the SSD in this example.)

Applications and Accuracy of Storage Data

The Dynamic Quantization SSD may be useful in applications that do not require 100% data storage accuracy. For example, self-driving cars may not need to identify exact faces of pedestrians on the road: it may be sufficient to detect only whether there is a pedestrian or not on the road. Another example application of Dynamic Quantization SSD may be for storing video data, where subsequent frames are usually quite similar to each other with only small differences between two adjacent frames. The Dynamic Quantization SSD may provide a significant increase in storage of video data, for example, Zoom stores all recorded meetings on the cloud.

The accuracy of data returned by the Dynamic Quantization SSD may be configured by the host, which may be used to determine the chunk size for each dataset. For example, for higher accuracy a smaller chunk size may be configured, and for lower accuracy a larger chunk size may be configured. Another way of controlling the accuracy of stored data is to specify and/or control the number of buckets into which the datasets may be grouped together. For example, the higher the number of clusters, the higher will be the accuracy of data persisted. If all the data chunks are clustered into only one single cluster or Class ID, the accuracy will be extremely low: it would not matter what data is written to the SSD because only one dataset would be returned for every data chunk that is written to the SSD. One the other hand, if each unique data chunk is clustered into its own group or Class ID, the accuracy will be 100%, but only identical data chunks may be de-duplicated and the effective storage capacity may be minimally increased.

FIG. 1 shows a machine including a lossy storage device, according to an embodiment of the inventive concept. In FIG. 1, machine 105, which may also be termed a host, is shown. Machine 105 may include processor 110. Processor 110 may be any variety of processor: for example, an Intel Xeon, Celeron, Itanium, or Atom processor, an AMD Opteron processor, an ARM processor, etc. While FIG. 1 shows a single processor 110 in machine 105, machine 105 may include any number of processors, each of which may be single core or multi-core processors, and may be mixed in any desired combination.

Machine 105 may also include memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types. Machine 105 may also include memory controller 120, which may be used to manage access to memory 115.

Machine 105 may also include a storage device, such as Solid State Drive (SSD) 125. SSD 125 may be used to store data. Processor 110 may run device driver 130, which may support access to SSD 125. Although FIG. 1 shows SSD 125, embodiments of the inventive concept may include any desired storage device, which may operate using any desired storage principle. Thus, the storage device may be an SSD, a hard disk drive, or any other desired storage device, and may store data using block-based storage or key-value based storage.

Although FIG. 1 depicts machine 105 as a server (which could be either a standalone or a rack server), embodiments of the inventive concept may include machine 105 of any desired type without limitation. For example, machine 105 could be replaced with a desktop or a laptop computer or any other machine that may benefit from embodiments of the inventive concept. Machine 105 may also include specialized portable computing machines, tablet computers, smartphones, and other computing machines. In addition, an application that may be accessing data from SSD 125 may located in another machine, separate from machine 105 and accessing machine 105 via a network connection traversing one or more networks of any types (wired, wireless, global, etc.).

Figure 2:
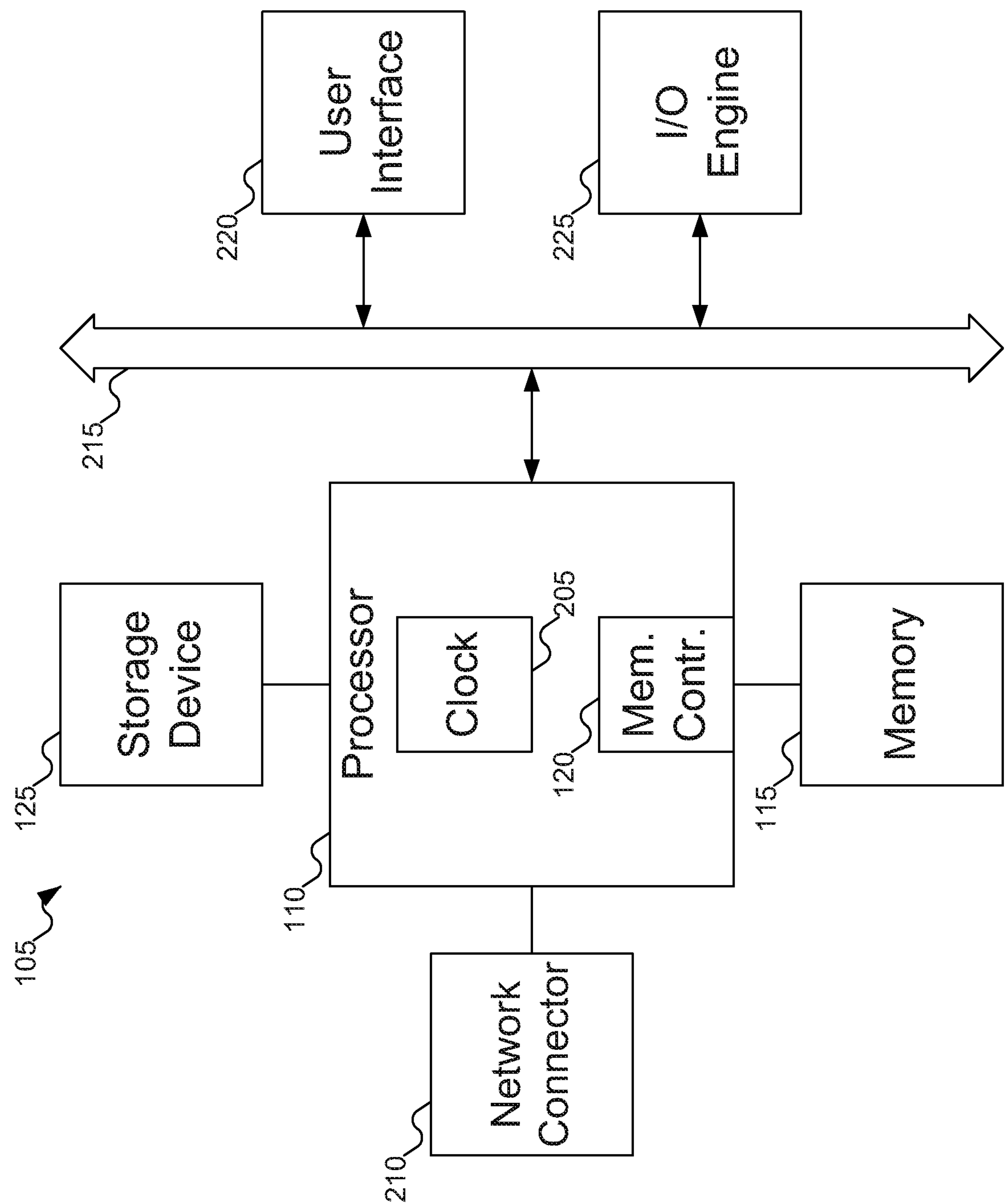
FIG. 2 shows additional details of the machine of FIG. 1.

FIG. 2 shows additional details of machine 105 of FIG. 1. In FIG. 2, typically, machine 105 includes one or more processors 110, which may include memory controllers 120 and clocks 205, which may be used to coordinate the operations of the components of device 105. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3:
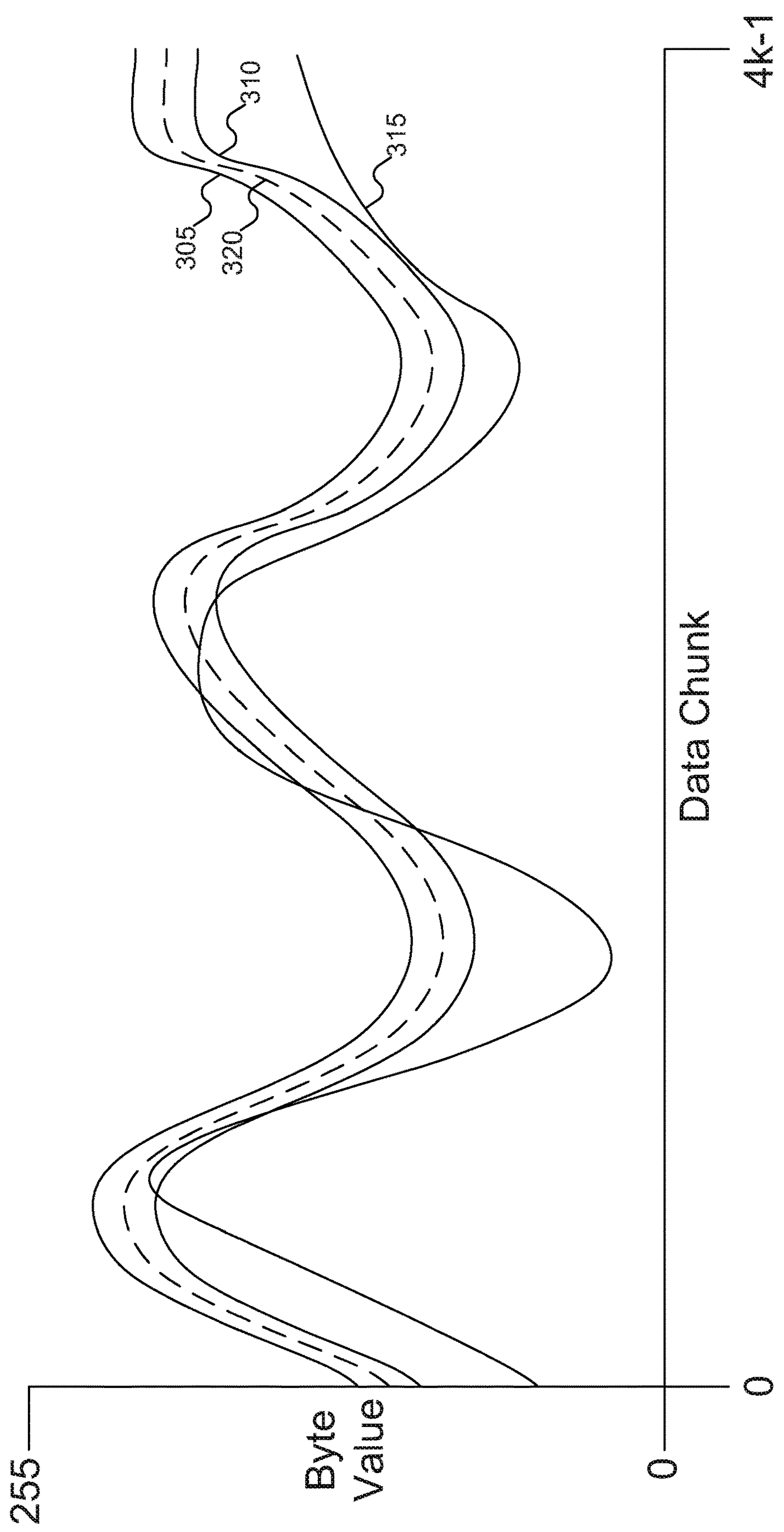
FIG. 3 shows an example visualization of data chunks that may be considered the same class or different classes.

FIG. 3 shows an example visualization of data chunks that may be considered the same class or different classes. In FIG. 3, data chunks 305, 310, and 315 are shown. Data chunks 305, 310, and 315 are shown as being 4 KB in size, but may be of any desired chunk sizes, as discussed further below with reference to FIG. 6.

Data chunks 305 and 310 are similar to each other, varying relatively minimally over the entire length of the data chunks. When using lossy storage, data chunks 305 and 310 may be considered similar enough to be assigned to the same class ID. This class ID may be represented using a data chunk which may be similar to or different from either or both of data chunks 305 and 310. For example, data chunk 320 (shown with a dashed line in FIG. 3) may be the arithmetic mean of data chunks 305 and 310, and may be stored on SSD 125 of FIG. 1. Thus, data chunks that closely resemble each other, such as data chunks 305 and 310, may be treated as a single dataset, despite the differences between them.

By storing a single data chunk, such as data chunk 320, for a class, SSD 125 of FIG. 1 may avoid needing to store every data chunk separately. Thus, multiple data chunks written by machine 105 of FIG. 1 may end up mapped to the same class ID and represented using a single data chunk. The advantage of this approach is that fewer data chunks may be stored on SSD 125 of FIG. 1, leaving more space for other data. The downside of this approach is that the data stored as representing a particular class ID may differ somewhat from the data actually written by machine 105 of FIG. 1. This concept, termed "lossy storage", centers on the principle that if the data provided is "close enough" to the original data, the differences between the original data and the provided data may be acceptable. But provided machine 105 may accept the loss of accuracy from using data chunk 320, this downside may be an acceptable compromise.

An example of lossy storage in the arena of image storage is the use of the JPG format. The JPG format operates on the principle that the full detail of the image may be beyond what the human eye can see. By making some of the details of the image less clear, the size of the file needed to store the image may be smaller than the size of the file storing the image at full resolution, without any real loss of information in the image to the human eye. In a similar manner, if the differences between the data chunk as stored and the original data are tolerable, the amount of space needed to store data on the storage device may be reduced by having multiple (potentially different) data chunks "share" a common data chunk as stored on the storage device.

In comparison with how data chunks 305 and 310 are fairly similar, data chunk 315 is significantly different from either of data chunks 305 and 310. Thus, data chunk 315 may be assigned to a different class than data chunks 305 and 310.

This process of dividing a data stream into data chunks and analyzing each data chunk to determine a class ID may be termed "quantization" (although in fact only the data chunks are "quantized": the assignment of the class ID to a data chunk is technically not part of the ordinary meaning of "quantization").

In the discussion above, a number of factors have been glossed over, all of which may factor into which class a data chunk may be assigned. First, the size of the data chunk may be variable. The data chunk may be 4 KB (or about 4 KB), 8 KB (or about 8 KB), or any other number of bytes. In addition, which there are advantages to using a chunk size that corresponds to a block size or a sector size of the underlying storage device (since there would be little or no wasted space when storing the data chunk), chunk sizes may vary from the block or sector size of the storage device.

Second, there may be a relationship between the size of a data chunk and the accuracy of the data stored. As a general rule, the smaller the size of the data chunk, the higher the accuracy of the data stored, even relative to data that may be different from that stored. The reason is simple: the smaller the size of the data chunk, the fewer the number of bits/bytes that may be different between the representative data for the class and the data chunk provided by machine 105 of FIG. 1, which means that the data is more likely to be accurate.

Third, the accuracy for any given data chunk may be variable. That is, machine 105 of FIG. 1 may write multiple chunks of data to the storage device, with each chunk having a different associated accuracy. Each write request sent by machine 105 of FIG. 1 may specify a different accuracy as part of the write command, or data associated with a particular application or data stream may be assigned a particular accuracy, among other possibilities.

Note that since there may be a relationship between the size of a data chunk and the accuracy of the data stored as noted above, if machine 105 of FIG. 1 (or an application on machine 105 of FIG. 1) specifies a desired accuracy level, the storage device may select a data chunk size that provides the desired accuracy level. An accuracy level may be understood to be a definition of how similar two datasets should be for them to be assigned to the same class ID; if the two datasets are not sufficiently similar, they should be assigned different class IDs. Embodiments of the inventive concept may support accuracy levels to be configured as desired, either for use for all data on the storage device, or for data originating at individual machines, or for data originating at individual applications. Embodiments of the inventive concept may also permit applications or machines to reconfigure the desired accuracy level at any time. In theory, every data chunk written by machine 105 of FIG. 1 could be assigned a different accuracy level.

For example, it may happen that when a data chunk size of 8 KB is used, the accuracy may be 90%, and when a data chunk size of 4 KB is used, the accuracy may be 95%. If the application (or machine 105 of FIG. 1) requests an accuracy level of 95%, then the storage device may select a data chunk size of 4 KB to provide the desired accuracy, even if the default data chunk size (i.e., the data chunk size used when no other conditions are established) might be 8 KB.

On the other hand, if the application (or machine 105 of FIG. 1) requests an accuracy level of 90%, then the storage device may select a data chunk size of 8 KB to provide the desired accuracy, even if the default data chunk size might be 4 KB (which might provide an accuracy level of 95%).

The accuracy level of each data chunk size may be determined in advance using empirical testing, or it may be measured dynamically at run-time by comparing a data chunk with the representative data chunk for the selected class ID. Note that if more than one technique is used to determine the class ID (as discussed below with reference to FIG. 6), different techniques may result in different accuracy levels for the same size of data chunk, in which case the data chunk size may depend on both the desired accuracy level and the selected technique used to determine the class ID for a data chunk.

It is also worth considering what happens in the edge case where an application requests an accuracy level of 100%

(that is, no loss of data). With an accuracy level of 100%, an application may specify that no data loss is tolerated: the data should be stored exactly as provided. Thus, if the data in two different write requests, each with a desired accuracy level of 100%, are both assigned to the class ID, then the data in the two write requests is identical. In effect, embodiments of the inventive concept may perform data deduplication. But even in such an edge case, embodiments of the inventive concept may be distinguishable from conventional data deduplication solutions, as the mapping of the logical block address (LBA) to a class ID, and from there to the physical block address (PBA), is not performed in conventional data deduplication solutions. Nor may conventional data deduplication solutions be generalized to handle mapping different data to the same location on a storage device, since conventional data deduplication assumes that only identical data may be mapped to the same location on the storage device. Introducing a lossy comparison into a conventional data deduplication system would also require applications that want conventional data deduplication to start specifying accuracy levels, which requires such applications to be modified. With embodiments of the inventive concept that default to a particular data chunk size and/or accuracy level, appropriately configured storage devices may be inserted into machines, such as machine 105 of FIG. 1, without the machine or any applications running thereon needing any modification.

Fourth, FIG. 3 does not address the question of what data is actually stored on the storage device, nor whether such data is updated over time. Embodiments of the inventive concept may support different update strategies for the representative data chunk for a class ID (also called persistence policies or persistence functions). In some embodiments of the inventive concept, the initial data assigned to the class ID (that is, the first data received in a write request that is assigned to that class ID) may be stored as the representative data for the class ID, and may be left on the storage device without update. Thus, for example, if data chunk 305 was the first data in the first write request received by the storage device that was assigned to the class ID, then data chunk 305 may be returned in response to any later read request (such as a read request specifying the LBA associated with data chunk 310).

In other embodiments of the inventive concept, the most recent data assigned to the class ID may be stored as the representative data for the class ID. Thus, for example, if data chunk 305 was the first data chunk assigned to the class ID and data chunk 310 was the second data chunk assigned to the class ID, then data chunk 310 would be returned (even in response to a read request specifying the LBA associated with data chunk 305).

In yet other embodiments of the inventive concept, the representative data chunk may be updated in a manner that factors in earlier data written to the class ID. Examples of such techniques may include weighted averaging and centroid calculations. As an example of a weighted averaging, weights may be determined (which may be either specified at the time of manufacture of the storage device and not alterable or configurable by machine 105 of FIG. 1). The most recently received data chunk may be combined with the previous representative data chunk by multiplying the value of the most recently received data chunk by one weight and by multiplying the previous representative data chunk by another weight, and then summing the two products. In some implementations, the weights may range in value from 0 to 1 (which may keep the representative data chunks at the same scale as the data chunks assigned to the class ID), and the two weights may sum to 1 (in which case one of the values may be calculated as 1−weight of the other weight). Using such a technique, the weights may either favor the older data chunks (if the weight by which the previous representative data chunk is multiplied is higher) or the newer data chunk (if the weight by which the new data chunk is multiplied is higher). The result of the sum of this calculation may then be stored as the new representative data chunk for the class ID.

Note that embodiments of the inventive concept may extend to using more than just two data chunks (i.e., the new data chunk and the previous representative data chunk), and may therefore use more than two weights. In the edge case, weights (which may be the same or different, as desired) may be assigned to every data chunk ever assigned to the class ID, with the new representative data chunk being the weighted average of all data chunks assigned to the class ID. Note that in the particular edge case where every data chunk ever assigned to the class ID is used in the calculation of the weighted average, and the weights are all identical and sum to 1 (i.e., if there are n data values then the weights are all 1/n), then the weighted average may be described as calculating the centroid of the data chunks, since the centroid of a cluster of data points in an n-dimensional space is the arithmetic mean of all the points within the given cluster.

Note too that tracking the centroid of the data chunks for the class ID as the representative data chunk for the class ID does not necessarily entail storing every data chunk: if the current data chunk is the n-th data chunk to be assigned to the class ID, then the centroid of the class ID data chunks may be calculated as n−1 multiplied by the previous representative data chunk for the class ID, plus the new data chunk assigned to the class ID, divided by n. That is, given the sum of all previous data chunks assigned to the class ID, which may be calculated as the previous centroid multiplied by the number of data chunks used in calculating that previous centroid, the new centroid may be calculated by adding in the new data chunk, then dividing by the number of data chunks now assigned to the class ID. Thus, the only additional data that may be stored is the value n, identifying how many data chunks are assigned to the class ID.

In addition, the storage device may apply a single persistence policy to all data stored on the storage device, or different persistence policies may be used for different techniques used to assign class IDs, or to different class IDs. Thus, for example, one class ID might use the first data chunk as the representative data chunk for the class ID, another class ID might track a weighted average of the representative data chunk and the new data chunk, a third class ID might use the most recent data chunk, and so on.

The storage device may apply a single persistence policy to all data stored on the storage device. Or, the persistence policy to be used may depend on the class ID (that is, different class IDs may use different persistence policies). The persistence policy may also depend on the accuracy level of the data: some persistence policies may be better suited to data that may tolerate a significant loss of the original data, whereas other persistence policies may be better suited to data that has a low tolerance for data loss.

For example, in embodiments of the inventive concept where the persistence policy results in a change to the representative data chunk when a new data chunk is assigned to the class ID (after the first data chunk), that change to the representative data chunk may affect how accurate the representative data chunk for the class ID is for previous data chunks assigned to that class ID. Consider, for example, the situation in which data chunk 305 is received from an application requesting an accuracy level of 95% (that is, the application is willing to tolerate up to 5% of variation between the data written and the data read), and data chunk 305 is first data chunk assigned to class ID 101 (which means that when machine 105 of FIG. 1 sends a read request for the data chunk, data chunk 305 would be returned 100% accurately). When data chunk 310 is received and assigned to class ID 101, the representative data chunk for class ID 101 may be updated. This update may affect whether the representative data chunk for class ID 101 is still sufficiently accurate for data chunk 305.

If the persistence policy keeps the initial data chunk unchanged, then there is no concern about the representative data chunk for class ID 101 not being sufficiently accurate when data chunk 305 is later read. (In fact, any other data chunk assigned to class ID 101 would also have its accuracy unchanged, since the persistence policy would not change the representative data chunk.) But what if the persistence policy replaces the representative data chunk with the most recent data chunk assigned to the class ID? If data chunk 310 is more than 5% different from data chunk 305, then the update of the representative data chunk would mean that the representative data chunk is no longer sufficiently accurate. This problem may exacerbate if another data chunk is written that is close enough to data chunk 310 to be assigned to class ID 101, but is even further away from data chunk 305: the representative data chunk may drift further and further away from data chunk 305 leading to lower and lower accuracy levels for data chunk 305.

On the other hand, if the persistence policy specifies that a weighted average or a centroid is kept for the representative data chunk for the class ID, the update of the representative data chunk for the class ID might or might not be acceptable. For example, even though data chunk 310 might be too far from data chunk 305 for data chunk 310 to be used as the representative data chunk, a weighted average or centroid of data chunks 305 and 310 (as shown by data chunk 320) might be within the accuracy level of the write request of data chunk 305. Thus, the particular persistence policy applied may affect whether the representative data chunk is within the accuracy level specified by machine 105 of FIG. 1.

There are a number of ways to address this situation. One possibility (the easiest to implement) may be that the specified accuracy level is only considered when the data is first assigned to the class ID. Any “drift” of the representative data chunk for the class ID may be ignored. Another possibility (the most complicated) may be to check whether the persistence policy will shift the representative data chunk sufficiently far away from any previous data chunk that the new data chunk is better assigned to a new class ID. But this approach would require somehow tracking all the previous data chunks assigned to the class ID, which may effectively defeat the purpose of lossy storage. A third possibility may be to only assign data chunks to a single class ID if the new data chunk is sufficiently similar to the representative data chunk and requests the same level of accuracy as other data chunks assigned to the class ID. Different requested accuracy levels may be assigned to different class IDs, even with identical data. Thus, for example, if an application specifies a desired accuracy level of 100% (i.e., no data loss) for a particular data chunk, then only data chunks that are 100% identical may be assigned to the same class ID as that data chunk to prevent any possible “drift” and loss of data.

When similarity and/or distance functions are used to determine the class ID, the similarity and/or distance functions may compare the received data chunk with the representative data chunk stored on the storage device. (This may be compared with neural networks, machine learning algorithms, and other classifiers, which may use internal models to classify a received data chunk that may be independent of the representative data chunk stored on the storage device.) Since the amount of variation between two such data chunks is absolute (the distance from data chunk A to data chunk B is the same as the distance from data chunk B to data chunk A), how the accuracy of the representative data chunk may be measured may be a symmetrical operation.

It might appear that since there is a relationship between accuracy level and data chunk size, once the data chunk size is selected the related accuracy level is guaranteed. But this might not be true. For example, assume a data chunk size of 4 KB is selected. If a data chunk that contains all 0s is considered sufficiently similar to a data chunk containing all Is to be assigned to the same class ID, then the logical conclusion is that virtually every data chunk would be assigned to that class ID. But if every data chunk would be assigned to the same class ID, the accuracy level could become a meaningless concept. Thus, while a particular data chunk size might be related to an afforded accuracy, a data chunk size does not guarantee a particular accuracy level: how similar (or different) a particular data chunk is from the representative data chunk for a class ID may still be a pertinent consideration.

Fifth, the specifics of how data chunks may be assigned to particular class IDs is not discussed with reference to FIG. 3. There are many different ways in which data chunks may be assigned to class IDs. Neural networks, machine learning algorithms, or other classifiers (such as autoencoders and variational autoencoders, deep neural networks with clustering loss functions, self-organizing map (SOM) neural networks, generative adversarial networks (GANs), ClusterNet, and unsupervised learning techniques) may be used to assign data chunks to class IDs, as may similarity and/or distance functions (which are effectively two sides of the same coin).

For example, a similarity or distance function may measure how similar (or how different) a received data chunk is from the representative data chunk for a particular class ID. If the received data chunk is close enough to the representative data chunk for the class ID, then the data chunk may be assigned to that class ID; otherwise, the received data chunk may be assigned to another class ID (possibly a new class ID, if the received data chunk is sufficiently different from representative data chunks for all existing class IDs: that is, the received data chunk is sufficiently dissimilar—perhaps based on the accuracy level—from existing class IDs that they should not be used, or if the confidence level for any class ID that might be selected is below a threshold). Examples of similarity or distance functions may include cosine similarity or Euclidean distance functions. If the two datasets are sufficiently similar based on some threshold (for example, 90% similar), then the two datasets may be assigned to the same class ID.

Neural networks, machine learning algorithms, and other classifiers (which may henceforth be referred to as “class ID determiner circuitry”) may offer similar capabilities, albeit implemented differently. Instead of comparing a received data chunk with the representative data chunk for a particular class ID, class ID determiner circuitry may use internal models to represent data for the different class IDs. By performing an appropriate comparison between a received data chunk and the internal model, class ID determiner circuitry may determine which class ID may best represent the received data chunk. If a data chunk is assigned to a particular class ID, the class ID determiner circuitry may update the internal model to reflect the new data assigned to the class ID. Note that the internal model of the class ID determiner circuitry may be independent of the representative data chunk for the class ID stored on the storage device, which may be managed using the persistence policy. Note too that how the class ID determiner circuitry updates its internal model may be unrelated to any persistence policy applicable to the representative data for the class ID.

How neural networks, machine learning algorithms, other classifiers, and similarity and/or distance functions operate to assign data chunks to class IDs is essentially without limit, although whatever technique is used should return a class ID for a given data chunk. Thus, for example, one similarity or distance function might operate on the principle that the absolute difference between any two values in two data chunks should be less than some delta for the two data chunks to be assigned the same class ID, whereas another similarity or distance function might look at the overall sum of all differences between the two data chunks. The former implementation may permit an overall larger variation between the two data chunks, whereas the latter implementation may permit a single "spike" of a large difference between the two data chunks, if that "spike" is the only difference between the two data chunks.

Different class ID determiner circuitry may be best suited for different types of data. For example, one neural network may be designed to classify video data, another neural network may be designed to classify image data, a third neural network may be designed to classify audio data, a fourth neural network may be designed to classify data from the Internet of Things (IOT), and so on. This fact has at least three implications.

First, if a storage device offers multiple class ID determiner circuitry, each class ID determiner circuitry may operate on the data chunk independently. Thus, the storage device may send a received data chunk to just one class ID determiner circuitry, to any subset of the available class ID determiner circuitry, or to all available class ID determiner circuitry. The selection of which class ID determiner circuitry to send a particular received data chunk to may be made based on, for example, the type of data being sent. For example, as discussed above, one neural network may be designed to classify image data and another neural network may be designed to classify audio data. If the storage device can determine that a particular data chunk contains audio data, then the storage device may send the received data chunk to just the neural network designed to classify audio data, and not the neural network designed to classify video data.

Second, while storage device may attempt to focus a received data chunk to a particular class ID determiner circuitry, such focusing might not be possible. For example, a data chunk might be recognizable as audio data, or video data, or any specific type of data. Thus, the storage device might not know which class ID determiner circuitry to send a data chunk to. In addition, even if the storage device may know the type of the data chunk, the storage device might still send the data chunk to all class ID determiner circuitry. For example, the storage device might not be certain that the data is of the identified type. Or, the storage device might be implemented in a manner that sends all received data chunks to all available class ID determiner circuitry (a simple implementation).

But while each class ID determiner circuitry might determine a class ID for a given data chunk, a class ID determiner circuitry that is designed to handle video data might not be able to classify IOT data well. Thus, each class ID determiner circuitry may also provide a confidence level associated with the class ID. In essence, each class ID determiner circuitry may say "I think this data chunk belongs in this class ID, and here is how confident I am in my determination". The storage device may then use those confidence levels to select the final class ID from across all class ID determiner circuitry that considered the data chunk. For example, the storage device might select the class ID with the highest associated confidence level across all class ID determiner circuitry.

Note that it is possible that a class ID determiner circuitry might not classify a particular data chunk. For example, a particular data chunk might be so far removed from the type of data that the class ID determiner circuitry was designed to classify that the class ID determiner circuitry may not be able to classify the data. In that situation, the class ID determiner circuitry might not return any class ID at all, or may specify a very low (possibly zero) confidence level.

Note too that while each class ID determiner circuitry may output a class ID and/or a confidence level, there is no requirement that either value be unique across all class ID determiner circuitry. That is, for example, both class ID determiner circuitry 1 and class ID determiner circuitry 2 may determine that a particular received data chunk should be assigned to class ID "101", or that both determinations have associated confidence levels of, say, 90% (or both). Thus, while each class ID determiner circuitry may determine a particular class ID and/or a particular confidence level, neither value is necessarily unique.

Third, different class ID determiner circuitry may operate without reference to or even knowledge of other class ID determiner circuitry. That is, each class ID determiner circuitry may determine the class ID without any consideration of class IDs that might be used by other class ID determiner circuitry. This fact may be a consequence of the fact that each class ID determiner circuitry, particularly neural networks, machine learning algorithms, and other classifiers that use internal models, may assign class IDs without reference to anything stored on the storage device. Even class ID determiner circuitry that compares a received data chunk with data stored on the storage device is not necessarily free of such concerns: for example, two different similarity functions might assign different data chunks to a single class ID if both class ID determiner circuitry consider the data chunks they analyzed to be different from any stored data chunks, and therefore are to be assigned new class IDs (and by coincidence select the same new class ID).

Thus, for example, a neural network designed to classify video data and a neural network designed to classify IOT data might each assign data chunks (and not necessarily the same data chunks) to class ID "101". The fact that each class ID determiner circuitry assigned data to class ID "101" should not be understood to mean that the two data chunks are similar to each other, but only that they are similar to other data chunks with class ID 101 as assigned by the same class ID determiner circuitry. Put another way, different class ID determiner circuitry may use the same class ID to represent very different data. Thus, where a storage device supports more than one class ID determiner circuitry, the storage device may associate a combination of the class ID and an identifier of the class ID determiner circuitry with the data chunk, rather than just the class ID. (Of course, if there is a standard for assigning class IDs to data chunks such that a received data chunk would be assigned the same class ID regardless of what class ID determiner circuitry was used, then the class ID might not be combined with the identifier of the class ID determiner circuitry. But a logical consequence of such a standard would also be that only a single class ID determiner circuitry would be needed for any data chunks.)

Given the lossy nature of assigning data chunks to a common class ID and storing only one representative data chunk for the class, embodiments of the inventive concept may be used when applications accessing the storage device can tolerate such data loss. Examples of such applications may include video streams where individual frames of the video stream change only minimally (such as security streams, where the data may change only occasionally, or video conference feeds, where the background may generally remain unchanged), or machine learning algorithms. Other applications may also benefit: for example, audio or image storage, Internet of Things data, text documents, portable document format (PDF) documents, self-driving automobiles (which may be concerned only with whether an image contains a pedestrian, but not who the pedestrian is), etc. Note that a data chunk may not only be less than an entire document or data stream, but it may even be a subset of only a part of the data stream. For example, image data may be divided into red, green, and blue channels, with each channel quantized separately. Alternatively, the image data may be left intact (with dividing into channels) before quantizing.

Although the above discussion implies that data chunks come from individual data streams, embodiments of the inventive concept may support data chunks that include data from multiple streams. That is, data from multiple sources (such as different data streams from a single application, or data from multiple applications or even multiple machines) may be combined into a data chunk for classification. The assignment of class IDs to data chunks depends on the data in the data chunk, and does not necessarily depend on the source of the data.

Finally, the class ID assigned to various data chunks may be thought of as a logical representation of where a data chunk may be stored on a storage device, and may be unrelated to the physical address on the storage device where any data is actually stored (particularly for the class ID). That is, the class ID assigned to a data chunk may not be any more indicative of the actual physical location on the storage device of the data chunk, by itself, than a host-assigned LBA (or a storage device-assigned handle). Without an additional mapping from the class ID to the PBA (or some equivalent operation), it may not be possible to retrieve the representative data chunk for the class ID from the storage device.

Figure 4:
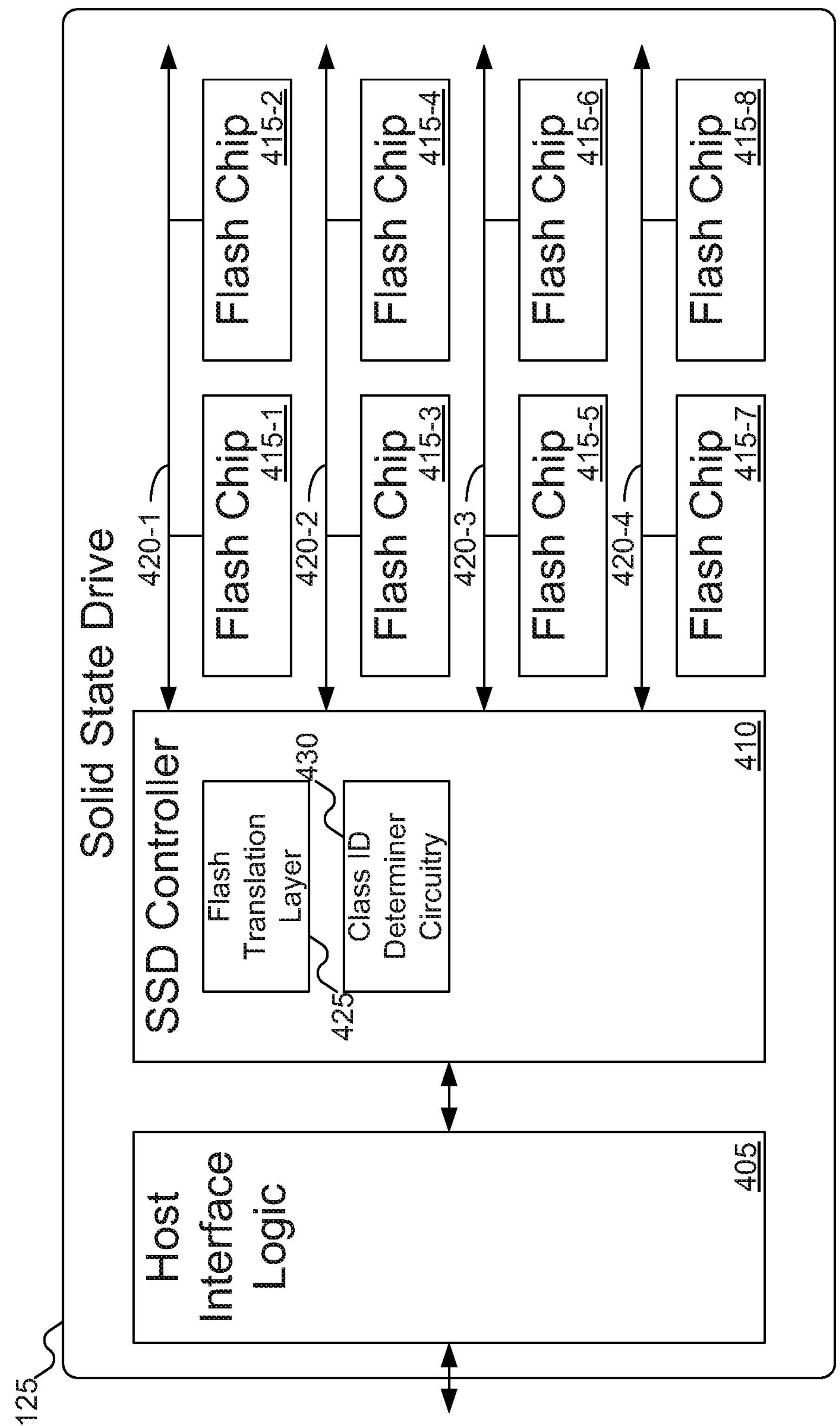
FIG. 4 shows details of the lossy storage device of FIG. 1.

FIG. 4 shows details of the lossy storage device of FIG. 1. In FIG. 4, the lossy storage device is shown to be an SSD, but embodiments of the inventive concept may use other forms of storage, such as hard disk drives. SSD 125 may include host interface logic (HIL) 405 (which may also be termed “host interface”), SSD controller 410, and various flash memory chips 415-1 through 415-8 (also termed “flash memory storage”), which may be organized into various channels 420-1 through 420-4. Host interface logic 405 may manage communications between SSD 125 and other components (such as processor 110 of FIG. 1). Host interface logic 405 may also manage communications with devices remote from SSD 125: that is, devices that are not considered part of machine 105 of FIG. 1, but in communication with SSD 125: for example, over one or more network connections. These communications may include read requests to read data from SSD 125, write requests to write data to SSD 125, and delete requests to delete data from SSD 125. Host interface logic 405 may manage an interface across only a single port, or it may manage interfaces across multiple ports. Alternatively, SSD 125 may include multiple ports, each of which may have a separate host interface logic 405 to manage interfaces across that port. Embodiments of the inventive concept may also mix the possibilities (for example, an SSD with three ports might have one host interface logic to manage one port and a second host interface logic to manage the other two ports).

SSD controller 410 may manage the read and write operations, along with garbage collection and other operations, on flash memory chips 415-1 through 415-8 using a flash memory controller (not shown in FIG. 4). SSD controller 410 may include flash translation layer 425 and class ID determiner circuitry 430. Flash translation layer may manage the mapping of LBAs (as used by machine 105 of FIG. 1) to PBAs where the data is actually stored on SSD 125. By using flash translation layer 425, host 105 of FIG. 1 does not need to be informed when data is moved from one block to another within SSD 125. Flash translation layer 425 is discussed further with reference to FIG. 5 below.

As discussed above with reference to FIG. 3, class ID determiner circuitry 430 may determine a class ID for a received data chunk, which SSD 125 may then use to store the received data chunk in a lossy manner. Class ID determiner circuitry 430 may implement a neural network, a machine learning algorithm, another classifier, and/or a similarly or distance function. While FIG. 4 shows only one class ID determiner circuitry 430, embodiments of the inventive concept may include any number (two or more) of class ID determiner circuitry 430.

While FIG. 4 shows SSD 125 as including eight flash memory chips 415-1 through 415-8 organized into four channels 420-1 through 420-4, embodiments of the inventive concept may support any number of flash memory chips organized into any number of channels. Similarly, while FIG. 4 shows the structure of a SSD, other storage devices (for example, hard disk drives) may be implemented using a different structure, but with similar potential benefits.

FIG. 5 shows details of flash translation layer 425 of FIG. 4. A conventional flash translation layer may include a single table, mapping an LBA received from machine 105 of FIG. 1 to a PBA on SSD 125. In contrast, in FIG. 5, flash translation layer 425 may include two mapping tables 505 and 510. Mapping table 505 may map an LBA received from machine 105 of FIG. 1 to a class ID, as determined by one of class ID determiner circuitry 430. As may be seen in FIG. 5, each entry in mapping table 505 may include an LBA of the data chunk (as received from machine 105 of FIG. 1), a class ID (as determined by class ID determiner circuitry 430), a classifier ID (which identifies which class ID determiner circuitry determined the class ID), and other parameters (which may include the classifier ID, any applicable persistence policies, and other information pertinent to the storage of the data chunk: for example, the accuracy level desired for that data chunk). Thus, for example, the data chunks associated with LBAs 0x1000 and 0x1001 are both assigned to class ID 101 by the class ID determiner circuitry identified by the number “1” (which means that read requests for both LBAs 0x1000 and 0x1001 may return the same representative data chunk, which may differ from the data chunks written by machine 105 of FIG. 1 for either LBA).

The data chunks with LBAs 0x1002 and 0x1003 are both assigned to class ID 201, but by different class ID determiner circuitry. Thus, the data chunks associated with LBAs 0x1002 and 0x1003 are not only represented by different data chunks than the data chunks with LBAs 0x1000 and 0x1001 but also from each other (since the class ID "201" was assigned to each data chunk by different class ID determiner circuitry).

Since mapping table 505 may map from an LBA to a class ID, mapping table 505 may include an entry for each unique LBA of a data chunk written by machine 105 of FIG. 1. This may be compared with the information stored in mapping table 510, discussed below.

While mapping table 505 shows each entry as including an LBA, embodiments of the inventive concept may use other information to identify the data chunk than an LBA. For example, while block-based SSDs and sector-based hard disk drives may use LBAs to represent the host's address of the data, key-value SSDs may use a key to identify the data from the host's perspective. In general, any reference to "LBA", in FIG. 5 and in other figures and elsewhere in this document, may be replaced with "key" or any other host-based identifier of the data chunk. In the remainder of this document, the term "data ID" is used to represent the host-based identifier of a data chunk, whether that identifier is an LBA, a key, or any other host-based identifier.

While mapping table 505 may map from a data ID (specifically, an LBA) to a class ID, that mapping alone does not locate data on the storage device. To locate the data on the storage device, the location of the data is desirable. Mapping table 510 may provide this information.

Mapping table 510 may map from a class ID to a PBA on the storage device. Each entry in mapping table 510 may include a class ID, a classifier ID that assigned the class ID, a PBA where data is stored on the storage device, and parameters. The parameters in mapping table 510 are similar to the parameters of mapping table 505. For example, FIG. 5 shows the entries in mapping table 510 as specifying particular persistence policies for each class ID.

Note that while mapping table 505 shows an entry for each data ID received from machine 105 of FIG. 1, mapping table 510 shows an entry for each class ID to which data has been assigned. Thus, while mapping table 505 includes four entries, mapping table 510 only shows three entries (as LBAs 0x1000 and 0x1001 both map to class ID 101 by classifier 1).

Finally, note that the combination of mapping tables 505 and 510 provide a complete mapping from a data ID to a PBA on the storage device. For example, LBA 0x1000 maps to class ID 101 by classifier 1 in mapping table 505, and class ID 101 by classifier 1 maps to PBA 0x1100 in mapping table 510.

Mapping tables 505 and 510 show how to map an LBA to a class ID, and then to a PBA. But as discussed above with reference to FIG. 3, in some embodiments of the inventive concept the storage device may return a handle, which may be used to bypass some or all of the use of mapping tables 505 and 510. For example, in some embodiments of the inventive concept, the PBA may be derivable from the handle, in which case both of mapping tables 505 and 510 may be omitted. In other embodiments of the inventive concept, the class ID may be derivable from the handle, and mapping table 510 may then be used to determine the PBA. In yet another embodiments of the inventive concept, mapping table 510 (or mapping table 505) may be modified to add a column including the handle, thereby allowing a mapping (directly or indirectly) from the handle to the PBA.

Figure 6:
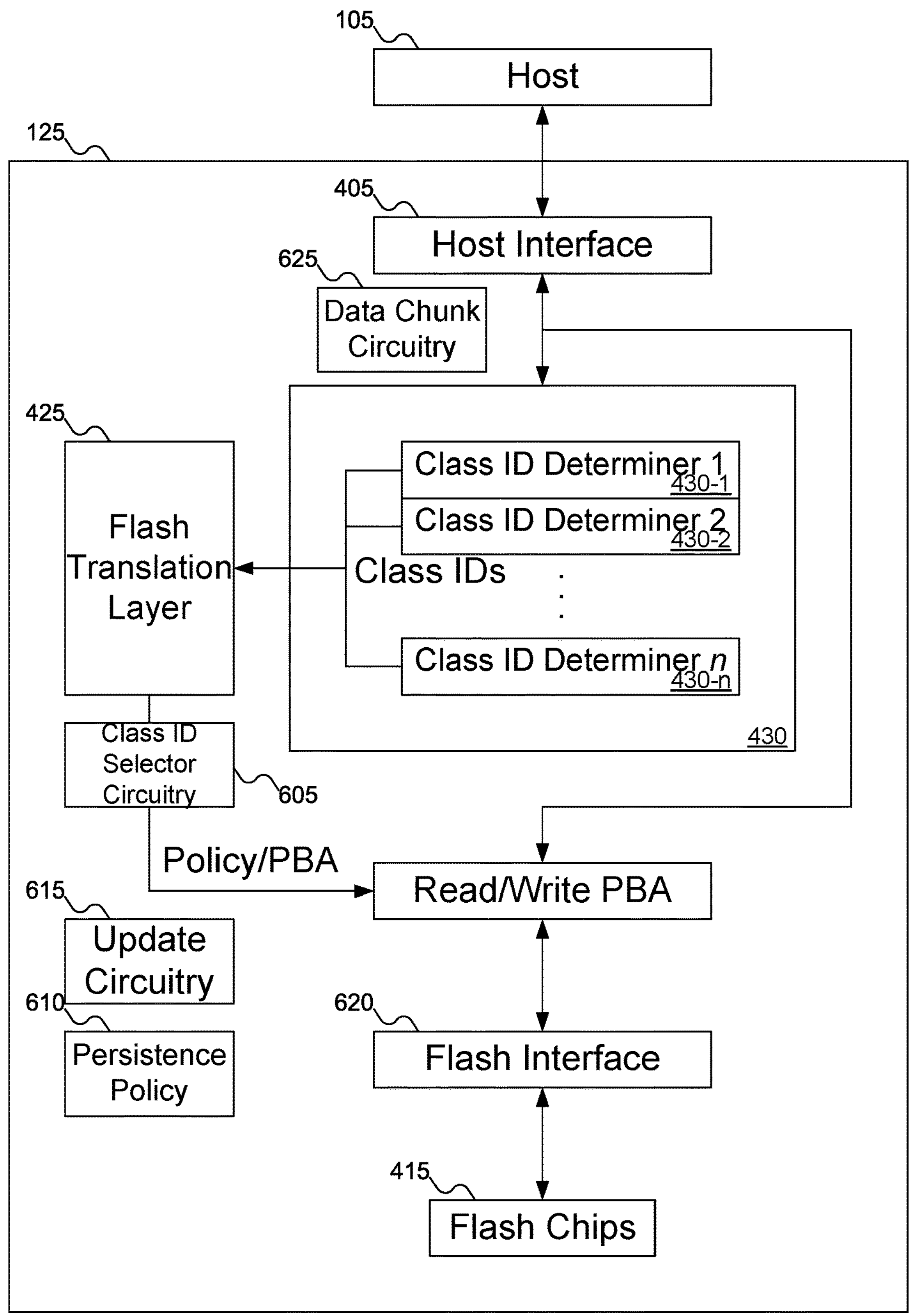
FIG. 6 shows an alternative view of the lossy storage device of FIG. 1.

FIG. 6 shows an alternative view of the lossy storage device of FIG. 1. In FIG. 6, SSD 125 may receive requests, such as write requests, read requests, and delete requests, from host 105, via host interface 405. How each type of request is handled may be different. Embodiments of the inventive concept may operate regardless of the type of storage device, since all storage devices support commands to write, read, and delete data (albeit with potentially different command names and data format).

When host interface 405 receives a write request, a data chunk may be extracted from the write request. This data chunk may then be fed to any of the class ID determiners 1-*n*. One, some, or all of class ID determiners 430-1 through 430-*n* may then return class IDs (and possibly corresponding confidence levels). Class ID selector circuitry 605 may then select one of the class IDs (perhaps in combination with the classifier identifier), perhaps based on the corresponding confidence levels, and use mapping tables 505 and 510 of FIG. 5 in flash translation layer 425 to map the data ID provided by host 105 to a PBA. Mapping table 505 of FIG. 5 may be updated if the data ID is new to mapping table 505 of FIG. 5, or if the class ID or the classifier ID has changed. Mapping table 510 of FIG. 5 may also be updated if the class ID and the classifier ID form a new combination (in which case no representative data may currently be stored on SSD 125. SSD 125 may also use the parameters in mapping tables 505 and/or 510 of FIG. 5 to determine persistence policy 610 for the representative data chunk of the selected class ID, and may use update circuitry 615 to update the representative data chunk for the class ID as directed by persistence policy 610. Once the PBA has been determined, flash interface 620 may be used to write the updated representative data chunk to flash chips 415, after which host 105 may be informed that the write request was successfully completed.

The above description of how a write request is handled is mostly in line with the sequence of elements shown in FIG. 6. But certain variations are also possible. For example, if the received data chunk is assigned to a new combination of class ID/classifier ID, or if the representative data chunk for a class ID is being updated and is being moved from one PBA to another PBA, then the PBA might not be known until after the representative data chunk is written to flash chips 415. In that case, the update of mapping table 510 of FIG. 5 might not happen until after the representative data chunk is written to flash chips 415. Other variations in the sequence are also possible: embodiments of the inventive concept are intended to include all such variations.

The above discussion assumes that the write request includes only a single data chunk (whatever the size of the data chunk might be). But host 105 might send more data in a single write request than may be stored in a single data chunk. In such a situation, data chunk circuitry 625 may be used. Data chunk circuitry may extract the data from the write request and divide that data into data chunks of appropriate size. Each data chunk may then be provided separately to class ID determiner circuitry 430-1 through 430-*n* as described above for separate classification.

Where the write request includes more than one data chunk, mapping table 505 of FIG. 5 may be updated with multiple entries to reflect each such chunk. Since the write request may specify the data ID for the entirety of the data to be written, other data IDs may be determined for individual data chunks, based on the size of an individual data chunk.

For example, consider the situation where a data chunk is 4 KB in size, and host 105 sends a write request that includes a total of 12 KB of data with an LBA of 0x1000. Since the write request includes more data than may be stored in a single data chunk, data chunk circuitry 625 may divide the 12 KB of data into appropriate chunks: in this situation, three data chunks (since 12 KB/4 KB=3). If LBAs are assigned based on chunk sizes, the LBA of the first chunk may be 0x1000, the LBA of the second chunk may be 0x1001, and the LBA of the third chunk may be 0x1002. Mapping table 505 may thus be updated to include three entries, one for each of LBAs 0x1000, 0x1001, and 0x1002. The parameters information in mapping table 505 may also be used to identify other data chunks (perhaps via their LBAs) that are part of the original write request.

When SSD 125 is a KV-SSD, keys might not be incremented by the size of a data chunk. But the key provided as the data ID by host 105 may have an index appended to it, to identify what portion of the original data is represented by a particular data chunk object. Thus, for example, if the data ID was key, the first data chunk may be written using a key identified as key_0, the second data chunk may be written using a key identified as key_1, and the third data chunk may be written using a key identified as key_2. These various keys may also be stored as parameters in the entries in mapping table 505 of FIG. 5 to identify related data.

Handling a read request or a delete request is different from handling a write request. In a read request, host 105 may supply a data ID, but no data. In that case, there is no data chunk to be analyzed by class ID determiner circuitry 430-1 through 430-*n*. Instead, the data ID may be presented directly to flash translation layer 425. Mapping table 505 of FIG. 5 may be used to map the data ID to a class ID, and mapping table 510 of FIG. 5 may be used to map the class ID to a PBA. That PBA may then be read from flash chips 415 using flash interface 620, and the data returned to host 105.

If it turns out that the data to be read spans more than one data chunk, multiple data chunks may be located using mapping tables 505 and 510 of FIG. 5. Each data chunk may then be read individually, the results assembled in the correct order, and the data then returned to host 105.

A delete request, on the other hand, is a little more involved. Like a read request, a delete request may supply a data ID, but no data. So, like a read request, a delete request may not involve class ID determiner circuitry 430-1 through 430-*n*. But since host 105 is indicating that the data stored at the provided data ID is no longer needed, an entry may be deleted from mapping table 505. (If the data to be deleted spans more than one data chunk, then related data may be located, perhaps using the parameters column in mapping table 505 of FIG. 5).

At this point, SSD 125 may decide whether any further data IDs refer to the same class ID as the data chunk being deleted. That is, was the data chunk to be deleted the only remaining data chunk represented by that class ID. SSD 125 may determine whether any other data IDs refer to the same class ID by searching mapping table 505 for any remaining entries that include the class ID (and the classifier identifier, if needed). If any entries exist in mapping table 505 of FIG. 5 that map a data ID to the class ID, then SSD 125 has completed handling of the delete request, and SSD 125 may return a result reporting successful deletion of the data.

On the other hand, if no entries in mapping table 505 of FIG. 5 map any data IDs to the class ID, then the class ID is no longer needed. The entry in mapping table 510 of FIG. 5, mapping the class ID to a PBA, may also be deleted, as may the data at the identified PBA, after which SSD 125 may return a result reporting successfully deletion of the data. Class ID determiner circuitry 430-1 through 430-*n* (as identified by the classifier identifier in mapping tables 505 and 510 of FIG. 5) optionally may be notified that the class ID is no longer in use, so that the class ID may be used for a new class of data chunks later.

While the above discussion considers data chunks that are fairly large (such as 4 KB or 8 KB), the size of data chunk may vary from 1 bit to gigabytes of data, terabytes of data, and beyond without limit. Using a data chunk size that is on the scale of the typical unit of storage on the storage device is useful for data management, but is not a requirement.

The question might arise as to why very small data chunks (on the order of bits or bytes) might be used, since there is some additional overhead associated with storing the class ID (which may relate to the number of data chunks that may be stored on the storage device, but otherwise may be unbounded in terms of size). For example, if the class ID uses 64 bits (8 bytes), then flash translation layer 425 of FIG. 4 is increased by at least 16 bytes (as the class ID is stored in both mapping tables 505 and 510 of FIG. 5). The answer is that any or all of class ID determiner circuitry 430-1 through 430-*n* might be able to detect patterns in the data that are not visible to a human examining the data. Thus, even though the overhead of storing data chunks that are sufficiently small might offset any benefit associated with storing data that is not full fidelity, classifying data chunks at such a granularity may provide useful information.

For example, consider an image. When the image is presented in its entirety to a human, patterns and details might be readily apparent. But if the image is divided into red/green/blue channels, it might be difficult to discern patterns looking at those channels individually, particularly patterns that might cross into different color channels. But class ID determiner circuitry 430-1 through 430-*n* may be able to identify patterns of similar or identical data that a human might miss.

Figure 7A:
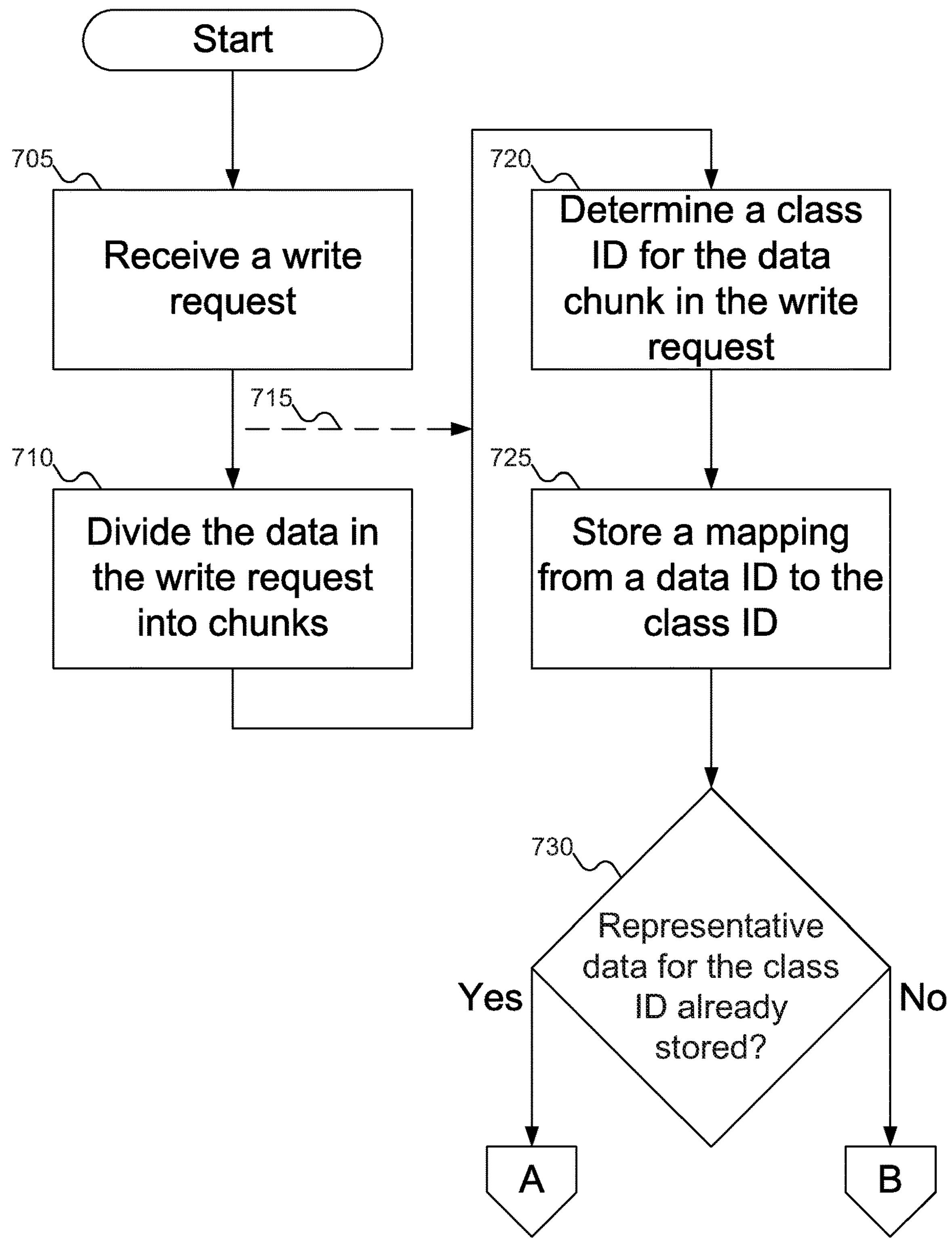
FIGS. 7A-7B show a flowchart of an example procedure for the lossy storage device of FIG. 1 to process a write request from the host of FIG. 1, according to embodiments of the inventive concept.
Figure 7B:
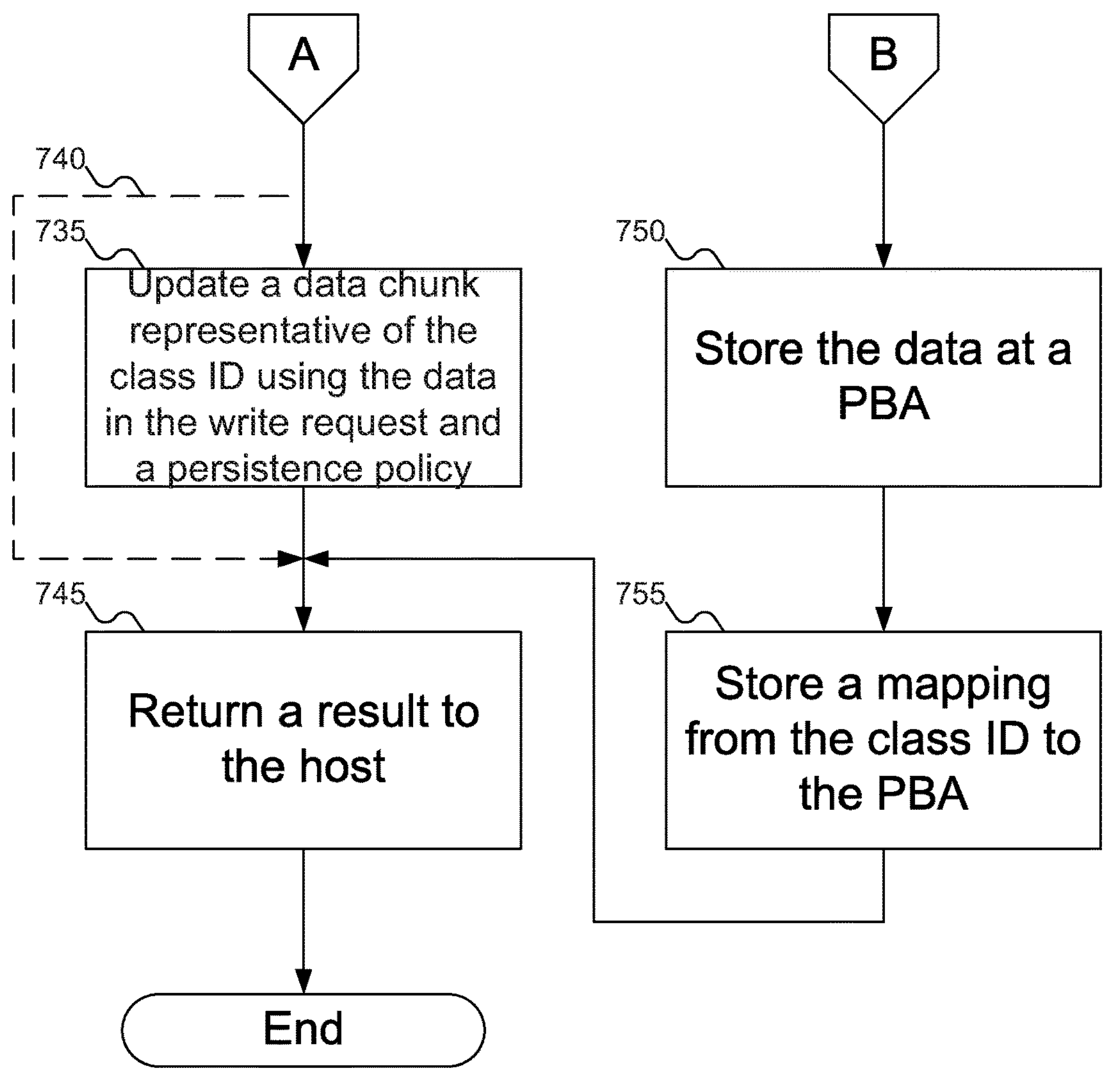

FIGS. 7A-7B show a flowchart of an example procedure for lossy storage device 125 of FIG. 1 to process a write request from host 105 of FIG. 1, according to embodiments of the inventive concept. In FIG. 7A, at block 705, SSD 125 of FIG. 1 may receive a write request from host 105 of FIG. 1 (via host interface 405 of FIG. 4). At block 710, if the data in the write request is larger than a single data chunk, data chunk circuitry 625 may divide the data into data chunks, each of which may be processed separately as though received in separate write requests. Block 710 may be omitted, as shown by dashed line 715. At block 720, class ID determiner circuitry 430 of FIG. 4 may determine a class ID for the data chunk. At block 725, mapping table 505 of FIG. 5 may be updated to store a mapping from the data ID to the class ID.

At block 730, mapping table 510 of FIG. 5 may be checked to see if there is a mapping from the class ID to the representative data chunk stored on SSD 125 of FIG. 1. If so, then at block 735 (FIG. 7B) the representative data chunk may be updated using the data chunk and persistence policy 610 of FIG. 6. Block 735 may be omitted, as shown by dashed line 740. Then, at block 745, SSD 125 of FIG. 1 may return a result to host 105 of FIG. 1 regarding the processing of the write request.

On the other hand, if there is no mapping from the class ID to the representative data chunk in mapping table 510 of FIG. 5, then at block 750 SSD 125 of FIG. 1 may store the data chunk at a PBA on SSD 125 of FIG. 1. At block 755, mapping table 510 of FIG. 5 may be updated to reflect map the class ID to the PBA where the representative data chunk is stored, and processing may continue with block 745 to return a result to host 105 of FIG. 1.

Figure 8:
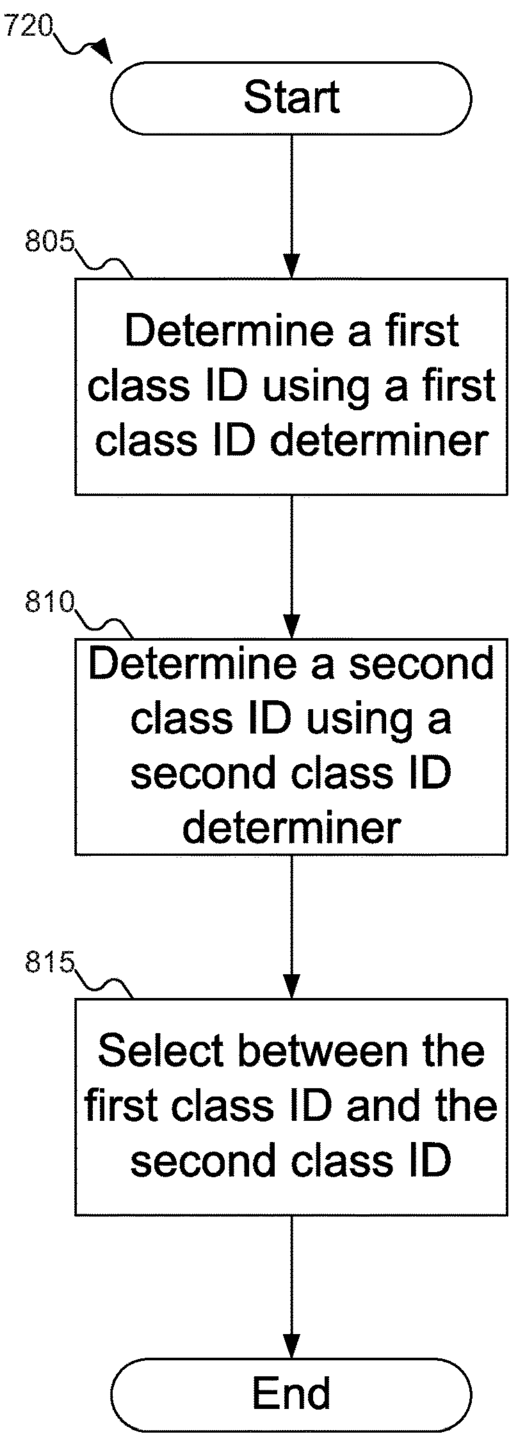
FIG. 8 shows a flowchart of an example procedure for the lossy storage device of FIG. 1 to select among different class IDs for a data chunk, according to an embodiment of the inventive concept.

FIG. 8 shows a flowchart of an example procedure for lossy storage device 125 of FIG. 1 to select among different class IDs for a data chunk, according to an embodiment of the inventive concept. In FIG. 8, at block 805, a first class ID determiner circuitry 430 of FIG. 4 may be used to determine a first class ID for the data chunk. At block 810, a second class ID determiner circuitry 430 of FIG. 4 may be used to determine a second class ID for the data chunk. (Blocks 805 and 810 are, of course, similar except for which class ID determiner circuitry is used, and may be repeated more times as needed, depending on the number of class ID determiner circuitry that are available.) Finally, at block 815, class ID selector circuitry 605 of FIG. 6 may select between the two (or more) class IDs that have been determined for the data chunk. Note that in blocks 805 and 810 the class ID determiner circuitry 430 may also determine a confidence level for the class IDs, which class ID selector circuitry 605 of FIG. 6 may use in selecting between the class IDs.

Figure 9:
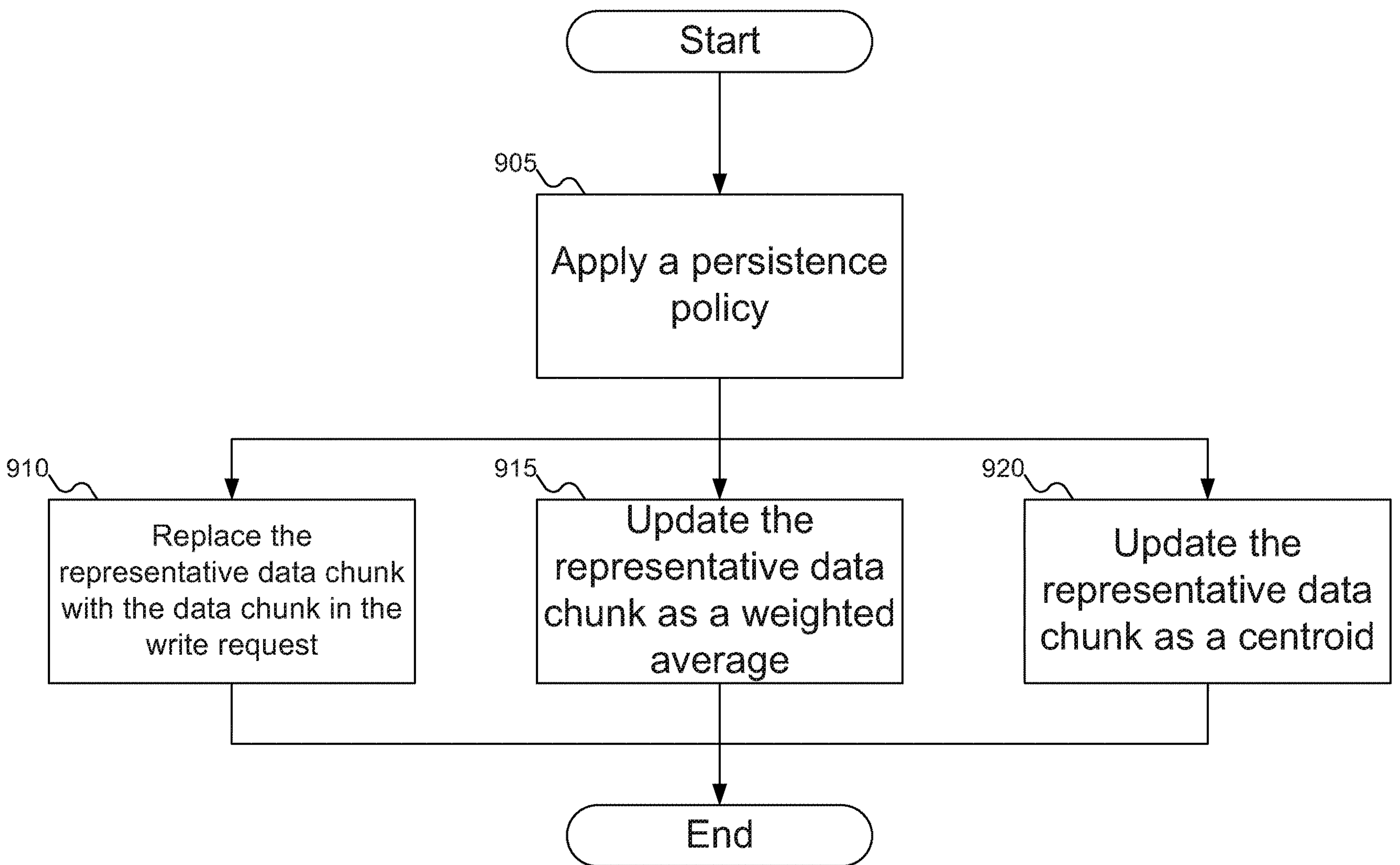
FIG. 9 shows a flowchart of an example procedure for the lossy storage device of FIG. 1 to use a persistence policy to update a representative data chunk, according to an embodiment of the inventive concept.

FIG. 9 shows a flowchart of an example procedure for lossy storage device 125 of FIG. 1 to use persistence policy 610 of FIG. 6 to update a representative data chunk, according to an embodiment of the inventive concept. In FIG. 9, at block 905, update circuitry 615 of FIG. 6 may apply persistence policy 610 of FIG. 6, which may specify how the representative data chunk may be updated. At block 910, update circuitry 615 of FIG. 6 may replace the representative data chunk with the newly received data chunk. Alternatively, at block 915, update circuitry 615 of FIG. 6 may replace the representative data chunk with a weighted average of the representative data chunk and the newly received data chunk. Alternatively, at block 920, update circuitry 615 of FIG. 6 may replace the representative data chunk with a centroid of all data chunks associated with the class ID.

Figure 10:
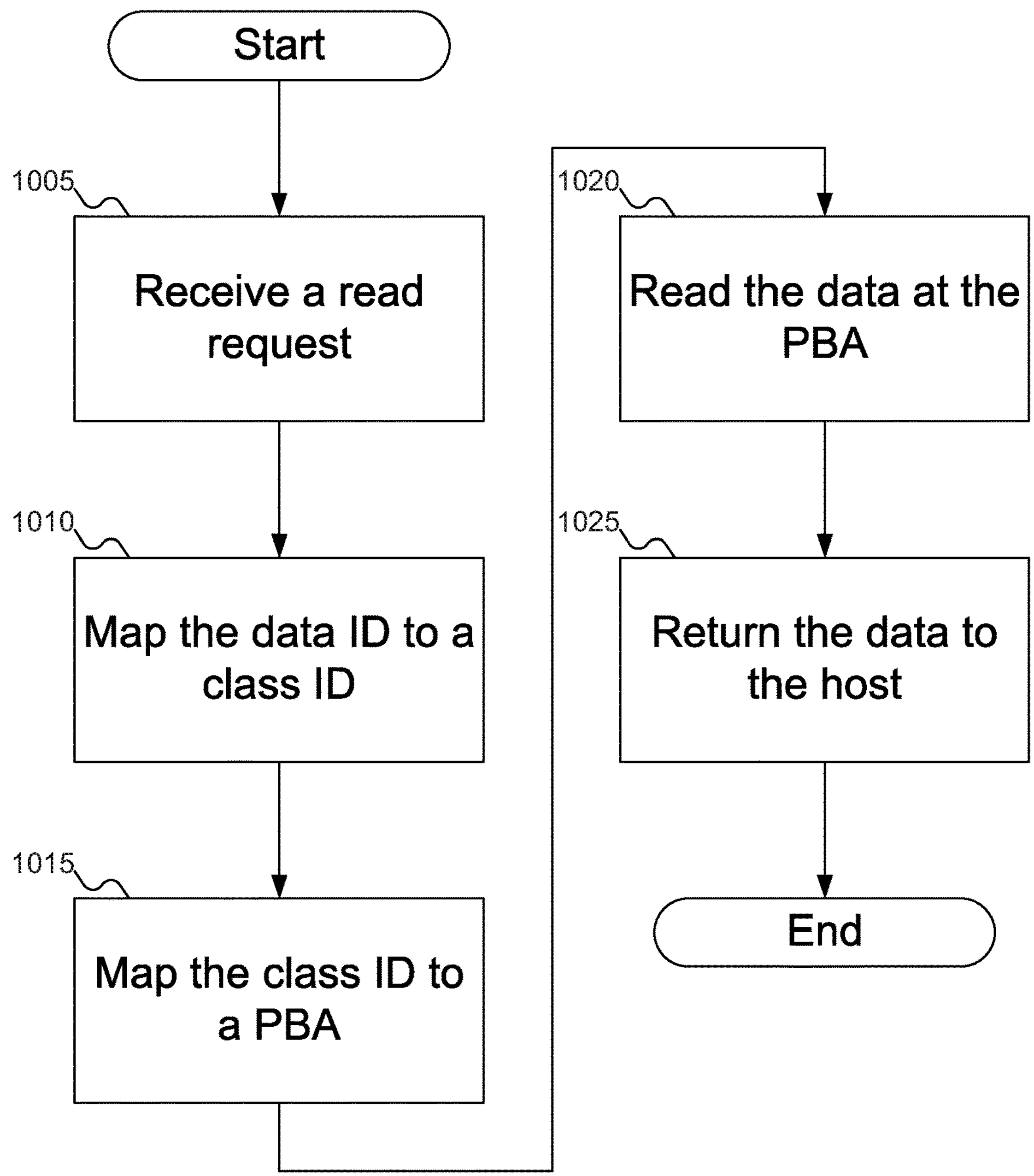
FIG. 10 shows a flowchart of an example procedure for the lossy storage device of FIG. 1 to process a read request from the host of FIG. 1, according to embodiments of the inventive concept.

FIG. 10 shows a flowchart of an example procedure for lossy storage device 125 of FIG. 1 to process a read request from host 105 of FIG. 1, according to embodiments of the inventive concept. In FIG. 10, at block 1005, SSD 125 of FIG. 1 may receive a read request from host 105 of FIG. 1 via host interface 405 of FIG. 4. At block 1010, SSD 125 of FIG. 1 may use mapping table 505 of FIG. 5 to map a data ID in the read request to a class ID. At block 1015, SSD 125 of FIG. 1 may use mapping table 510 of FIG. 5 to map the class ID to a PBA. At block 1020, SSD 125 of FIG. 1 may read the data from the PBA. Finally, at block 1025, SSD 125 of FIG. 1 may return the data to host 105 of FIG. 1.

Figure 11:
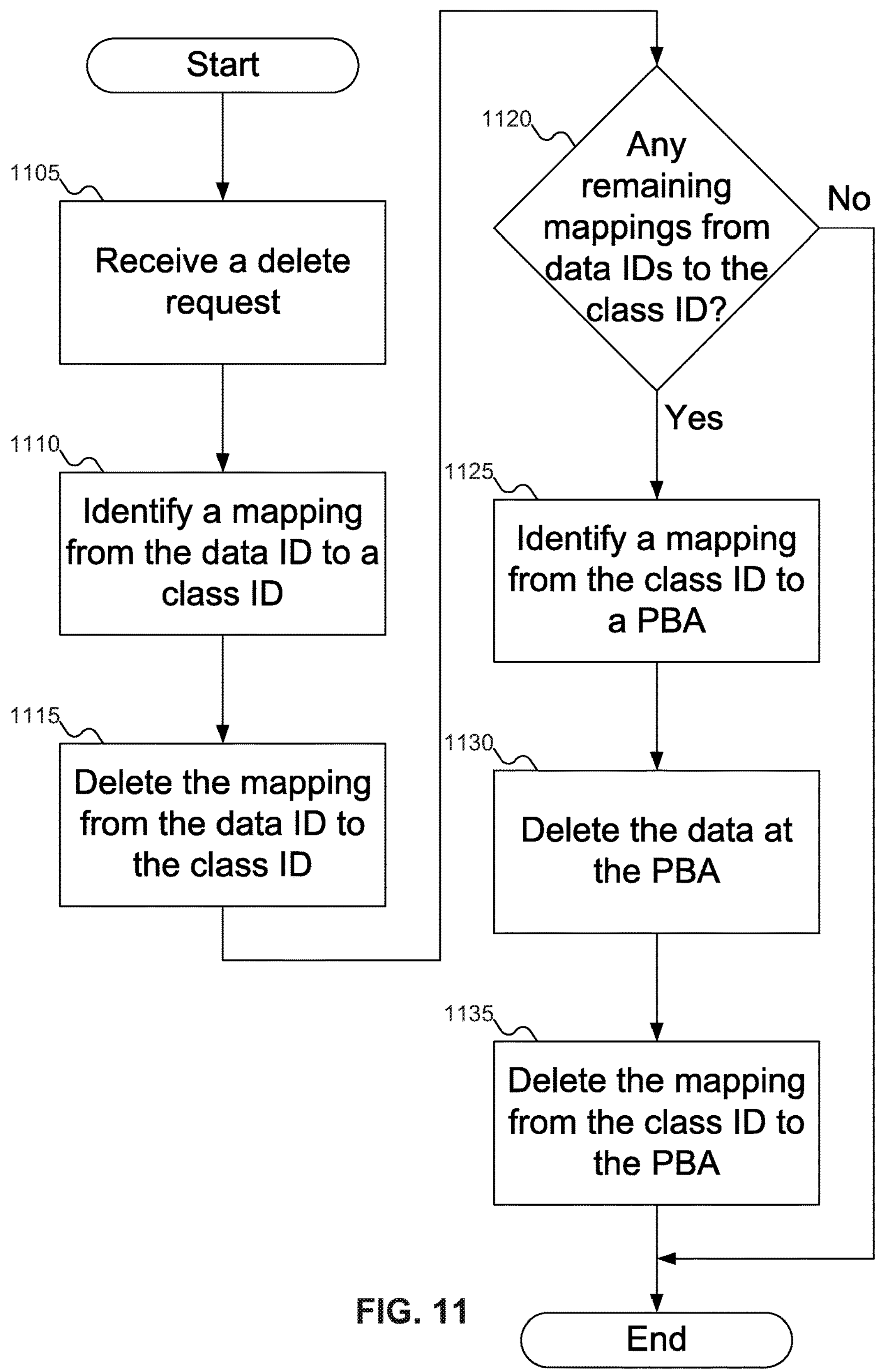
FIG. 11 shows a flowchart of an example procedure for the lossy storage device of FIG. 1 to process a delete request from the host of FIG. 1, according to embodiments of the inventive concept.

FIG. 11 shows a flowchart of an example procedure for lossy storage device 125 of FIG. 1 to process a delete request from host 105 of FIG. 1, according to embodiments of the inventive concept. In FIG. 11, at block 1105, SSD 125 of FIG. 1 may receive a delete request from host 105 of FIG. 1 via host interface 405 of FIG. 4. At block 1110, SSD 125 of FIG. 1 may identify a mapping from a data ID in the delete request to a class ID in mapping table 505 of FIG. 5. At block 1115, SSD 125 of FIG. 1 may delete the mapping from the data ID to the class ID from mapping table 505 of FIG. 5.

At block 1120, SSD 125 of FIG. 1 may check mapping table 505 of FIG. 5 to see if any other mappings to the class ID exist. If mapping table 505 of FIG. 5 includes any other mappings to the class ID, then processing is complete. Otherwise, since no mappings remain to the class ID, the representative data chunk is no longer needed, nor is the class ID. Thus, at block 1125, SSD 125 of FIG. 1 may identify a mapping from the class ID to a PBA in mapping table 510 of FIG. 5. At block 1130, SSD 125 of FIG. 1 may delete the representative data chunk stored at the identified PBA. Finally, at block 1135, SSD 125 of FIG. 1 may delete the mapping from the class ID to the PBA in mapping table 510 of FIG. 5. (While not shown in FIG. 11, SSD 125 of FIG. 1 may also notify any applicable class ID determiner circuitry 430 that the class ID has been deleted, so that class ID determiner circuitry 430 may reuse the class ID and/or remove any reference the class ID from any internal model or data.)

In FIGS. 7A-11, some embodiments of the invention are shown. But a person skilled in the art will recognize that other embodiments of the invention are also possible, by changing the order of the blocks, by omitting blocks, or by including links not shown in the drawings, irrespective of any elements that may specifically be omitted. All such variations of the flowcharts are considered to be embodiments of the invention, whether expressly described or not.

Embodiments of the inventive concept include technical advantages over conventional implementations. By using a lossy storage device, the effective storage capacity of a storage device may be increased, at the cost of some potential variation between the data written to the lossy storage device as compared with the data read from the lossy storage device. Multiple class ID determiner circuitry may be used to generate multiple class IDs that might be used, depending on the data chunk in question and/or its data type: each class ID determiner circuitry may provide a confidence level associated with the identified class ID, which may be used to select among the available class IDs. The class ID determiner circuitry used to organize data chunks into classes may also be used to identify patterns in data (which may be identified at finer levels of granularity than the size of a data chunk) that might not be visible to a user.

In addition, conventional data deduplication may be performed at the software level, like low precision compression. By adding data quantization and classification to the storage device, there is no need to perform deduplication or data compression at the software level, but neither is there necessarily a need for specialized hardware-based compression/encoding.

The following discussion is intended to provide a brief, general description of a suitable machine or machines in which certain aspects of the invention can be implemented. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 802.11. Bluetooth®, optical, infrared, cable, laser, etc.

Embodiments of the present invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Embodiments of the invention can include a tangible, non-transitory machine-readable medium comprising instructions executable by one or more processors, the instructions comprising instructions to perform the elements of the inventions as described herein.

Having described and illustrated the principles of the invention with reference to illustrated embodiments, it will be recognized that the illustrated embodiments can be modified in arrangement and detail without departing from such principles, and can be combined in any desired manner. And, although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

The foregoing illustrative embodiments are not to be construed as limiting the invention thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this invention as defined in the claims.

Embodiments of the invention can extend to the following statements, without limitation:

Statement 1. An embodiment of the inventive concept includes a storage device, comprising:

storage for data;

a host interface to receive a write request from a host at the storage device, the write request including a data chunk and a data identifier (ID);

class ID determiner circuitry to determine a class ID for the data chunk; and a mapping table to map the data ID to the class ID.

Statement 2. An embodiment of the inventive concept includes the storage device according to statement 1, wherein the storage device is one of at least a block-based Solid State Drive (SSD), a Key-Value (KV) SSD, a block-based storage device, a KV storage device, or a hard disk drive.

Statement 3. An embodiment of the inventive concept includes the storage device according to statement 1, wherein the data ID is one of a logical block address (LBA) and a key.

Statement 4. An embodiment of the inventive concept includes the storage device according to statement 1, wherein:

the write request includes a data; and the storage device further comprises a data chunk circuitry to divide the data into the data chunk and a second data chunk.

Statement 5. An embodiment of the inventive concept includes the storage device according to statement 4, wherein the data chunk circuitry divides the data into the data chunk and the second data chunk using a chunk size.

Statement 6. An embodiment of the inventive concept includes the storage device according to statement 5, wherein the host assigns the chunk size.

Statement 7. An embodiment of the inventive concept includes the storage device according to statement 5, wherein:

an accuracy level for the write request is specified by one of at least the host or an application running on the host; and the data chunk circuitry determines the chunk size associated with the accuracy level.

Statement 8. An embodiment of the inventive concept includes the storage device according to statement 5, wherein the chunk size is associated with one of at least a block size of a block-based storage device or a sector size of a hard disk drive.

Statement 9. An embodiment of the inventive concept includes the storage device according to statement 1, wherein the class ID determiner circuitry determines the class ID for the data chunk within an accuracy level associated with the write request.

Statement 10. An embodiment of the inventive concept includes the storage device according to statement 9, wherein the accuracy level for the write request is specified by one of at least the host or an application running on the host.

Statement 11. An embodiment of the inventive concept includes the storage device according to statement 9, wherein the class ID determiner circuitry determines the class ID for the data chunk within the accuracy level of a representative data chunk assigned to the class ID stored on the storage device.

Statement 12. An embodiment of the inventive concept includes the storage device according to statement 11, wherein the class ID determiner circuitry includes one of at least a similarity function or a difference function.

Statement 13. An embodiment of the inventive concept includes the storage device according to statement 9, wherein the class ID determiner circuitry determines a new class ID for the data chunk based at least in part on the data chunk not being within the accuracy level of a second data chunk stored on the storage device associated with an existing class ID.

Statement 14. An embodiment of the inventive concept includes the storage device according to statement 9, wherein the class ID determiner circuitry determines the class ID for the data chunk within the accuracy level of a model data chunk assigned to the class ID.

Statement 15. An embodiment of the inventive concept includes the storage device according to statement 14, wherein the class ID determiner circuitry includes one of at least a classifier or a neural network.

Statement 16. An embodiment of the inventive concept includes the storage device according to statement 1, wherein:

the class ID determiner circuitry determines a confidence level for the class ID; and the storage device further comprises a second class ID determiner to determine a second class ID and a second confidence level for the data chunk.

Statement 17. An embodiment of the inventive concept includes the storage device according to statement 16, further comprising a class ID selector circuitry to select between the class ID and the second class ID using the confidence level and the second confidence level.

Statement 18. An embodiment of the inventive concept includes the storage device according to statement 1, further comprising a second mapping table to map the class ID to a physical block address (PBA) in the storage, where the data chunk is stored at the PBA in the storage of the storage device.

Statement 19. An embodiment of the inventive concept includes the storage device according to statement 1, wherein the host interface returns a result to the host without the data chunk being stored in the storage of the storage device.

Statement 20. An embodiment of the inventive concept includes the storage device according to statement 1, wherein:

the storage includes a representative data chunk assigned to the class ID stored at a PBA; and the storage device further comprises:

a persistence policy; and an update circuitry to update the representative data chunk assigned to the class ID stored at the PBA using the persistence policy.

Statement 21. An embodiment of the inventive concept includes the storage device according to statement 20, wherein the update circuitry replaces the representative data chunk assigned to the class ID with the data chunk.

Statement 22. An embodiment of the inventive concept includes the storage device according to statement 20, wherein the update circuitry replaces the representative data chunk assigned to the class ID with a weighted average of the representative data chunk assigned to the class ID and the data chunk.

Statement 23. An embodiment of the inventive concept includes the storage device according to statement 20, wherein the update circuitry replaces the representative data chunk assigned to the class ID with a centroid of all data chunks represented by the class ID.

Statement 24. An embodiment of the inventive concept includes a method, comprising:

receiving a write request from a host at a storage device, the write request including a data chunk;

determining a class identifier (ID) for the data chunk; and storing a mapping from a data ID to the class ID in the storage device, wherein the class ID may be a logical representation of where the data is stored on the storage device.

Statement 25. An embodiment of the inventive concept includes the method according to statement 24, wherein the storage device includes one of a block-based Solid State Drive (SSD), a Key-Value (KV) SSD, a block-based storage device, a KV storage device, or a hard disk drive.

Statement 26. An embodiment of the inventive concept includes the method according to statement 24, wherein the data ID is one of a logical block address (LBA) and a key.

Statement 27. An embodiment of the inventive concept includes the method according to statement 24, wherein the write request includes the data ID.

Statement 28. An embodiment of the inventive concept includes the method according to statement 24, wherein receiving a write request from a host at a storage device includes:

receiving the write request from the host at the storage device, the write request including a data; and dividing the data into at least the data chunk and a second data chunk.

Statement 29. An embodiment of the inventive concept includes the method according to statement 28, wherein dividing the data into at least the data chunk and a second data chunk includes dividing the data into at least the data chunk and the second data chunk using a chunk size assigned by the host.

Statement 30. An embodiment of the inventive concept includes the method according to statement 28, wherein dividing the data into at least the data chunk and a second data chunk includes dividing the data into at least the data chunk and the second data chunk using a chunk size associated with an accuracy requested by the host.

Statement 31. An embodiment of the inventive concept includes the method according to statement 24, wherein a size of the data chunk is determined associated with one of at least a block size of a block-based storage device or a sector size of a hard disk drive.

Statement 32. An embodiment of the inventive concept includes the method according to statement 24, wherein determining a class ID for the data chunk includes determining the class ID for the data chunk using an accuracy level associated with the write request.

Statement 33. An embodiment of the inventive concept includes the method according to statement 32, wherein the write request includes the accuracy level.

Statement 34. An embodiment of the inventive concept includes the method according to statement 32, wherein determining the class ID for the data chunk using an accuracy level includes determining the class ID for the data chunk using the accuracy level specified by one of at least the host or an application running on the host.

Statement 35. An embodiment of the inventive concept includes the method according to statement 32, wherein determining the class ID for the data chunk using an accuracy level includes a determining the class ID for the data chunk where the data chunk is within the accuracy level of a representative data chunk assigned to the class ID stored on the storage device.

Statement 36. An embodiment of the inventive concept includes the method according to statement 32, wherein determining the class ID for the data chunk using an accuracy level includes determining a new class ID for the data chunk based at least in part on the data chunk not being within the accuracy level of a second data chunk stored on the storage device associated with an existing class ID.

Statement 37. An embodiment of the inventive concept includes the method according to statement 32, wherein determining the class ID for the data chunk using an accuracy level includes determining the class ID for the data chunk where the data chunk is within the accuracy level of a model data chunk assigned to the class ID.

Statement 38. An embodiment of the inventive concept includes the method according to statement 24, wherein determining a class ID for the data chunk includes:

determining a first class ID for the data chunk using a first classification approach; and determining a second class ID for the data chunk using a second classification approach.

Statement 39. An embodiment of the inventive concept includes the method according to statement 38, wherein:

determining a first class ID for the data chunk using a first classification approach includes determining a first confidence level for the first class ID; and determining a first class ID for the data chunk using a first classification approach includes determining a second confidence level for the second class ID.

Statement 40. An embodiment of the inventive concept includes the method according to statement 39, wherein determining a class ID for the data chunk further includes selecting the first class ID based on the first confidence level being greater than the second confidence level.

Statement 41. An embodiment of the inventive concept includes the method according to statement 24, further comprising:

storing the data chunk at a Physical Block Address (PBA) in the storage device; and storing a second mapping from the class ID to the PBA.

Statement 42. An embodiment of the inventive concept includes the method according to statement 41, further comprising returning a result from the storage device to the host that the data chunk was stored on the storage device.

Statement 43. An embodiment of the inventive concept includes the method according to statement 42, wherein:

the method further comprises generating the data ID by the storage device; and returning a result from the storage device to the host that the data chunk was stored on the storage device includes returning the data ID from the storage device to the host.

Statement 44. An embodiment of the inventive concept includes the method according to statement 24, further comprising returning a result from the storage device to the host without storing the data chunk in the storage device.

Statement 45. An embodiment of the inventive concept includes the method according to statement 24, further comprising updating a representative data chunk assigned to the class ID based at least in part on the data chunk.

Statement 46. An embodiment of the inventive concept includes the method according to statement 45, wherein updating a representative data chunk assigned to the class ID based at least in part on the data chunk includes applying a persistence policy to update the representative data chunk assigned to the class ID based at least in part on the data chunk.

Statement 47. An embodiment of the inventive concept includes the method according to statement 45, wherein updating a representative data chunk assigned to the class ID based at least in part on the data chunk includes replacing the second data chunk with the data chunk.

Statement 48. An embodiment of the inventive concept includes the method according to statement 45, wherein updating a representative data chunk assigned to the class ID based at least in part on the data chunk includes replacing the second data chunk with a weighted average of the data chunk and the second data chunk.

Statement 49. An embodiment of the inventive concept includes the method according to statement 45, wherein updating a representative data chunk assigned to the class ID based at least in part on the data chunk includes replacing the second data chunk with a centroid of all data chunks represented by the class ID.

Statement 50. An embodiment of the inventive concept includes the method according to statement 24, wherein determining a class identifier (ID) for the data chunk includes determining the class ID for the data chunk using class ID determiner circuitry, the class ID determiner circuitry including at least one of a similarity function, a difference function, a classifier, or a neural network.

Statement 51. An embodiment of the inventive concept includes the method according to statement 24, further comprising:

receiving a read request from the host at the storage device, the read request including the data ID;

mapping the data ID to the class ID;

mapping the class ID to a PBA;

reading a data at the PBA; and returning the data to the host from the storage device.

Statement 52. An embodiment of the inventive concept includes the method according to statement 24, further comprising:

receiving a delete request from the host at the storage device, the read request including the data ID; and deleting a mapping from the data ID to the class ID.

Statement 53. An embodiment of the inventive concept includes the method according to statement 52, further comprising:

determining that there is no mapping from a second data ID to the class ID;

deleting a mapping from the class ID to a PBA on the storage device; and deleting a data at the PBA on the storage device.

Statement 54. An embodiment of the inventive concept includes an article, comprising a non-transitory storage medium, the non-transitory storage medium having stored thereon instructions that, when executed by a machine, result in:

receiving a write request from a host at a storage device, the write request including a data chunk;

determining a class identifier (ID) for the data chunk; and storing a mapping from a data ID to the class ID in the storage device, wherein the class ID may be a logical representation of where the data is stored on the storage device.

Statement 55. An embodiment of the inventive concept includes the article according to statement 54, wherein the storage device includes one of a block-based Solid State Drive (SSD), a Key-Value (KV) SSD, a block-based storage device, a KV storage device, or a hard disk drive.

Statement 56. An embodiment of the inventive concept includes the article according to statement 54, wherein the data ID is one of a logical block address (LBA) and a key.

Statement 57. An embodiment of the inventive concept includes the article according to statement 54, wherein the write request includes the data ID.

Statement 58. An embodiment of the inventive concept includes the article according to statement 54, wherein receiving a write request from a host at a storage device includes:

receiving the write request from the host at the storage device, the write request including a data; and dividing the data into at least the data chunk and a second data chunk.

Statement 59. An embodiment of the inventive concept includes the article according to statement 58, wherein dividing the data into at least the data chunk and a second data chunk includes dividing the data into at least the data chunk and the second data chunk using a chunk size assigned by the host.

Statement 60. An embodiment of the inventive concept includes the article according to statement 58, wherein dividing the data into at least the data chunk and a second data chunk includes dividing the data into at least the data chunk and the second data chunk using a chunk size associated with an accuracy requested by the host.

Statement 61. An embodiment of the inventive concept includes the article according to statement 54, wherein a size of the data chunk is determined associated with one of at least a block size of a block-based storage device or a sector size of a hard disk drive.

Statement 62. An embodiment of the inventive concept includes the article according to statement 54, wherein determining a class ID for the data chunk includes determining the class ID for the data chunk using an accuracy level associated with the write request.

Statement 63. An embodiment of the inventive concept includes the article according to statement 62, wherein the write request includes the accuracy level.

Statement 64. An embodiment of the inventive concept includes the article according to statement 62, wherein determining the class ID for the data chunk using an accuracy level includes determining the class ID for the data chunk using the accuracy level specified by one of at least the host or an application running on the host.

Statement 65. An embodiment of the inventive concept includes the article according to statement 62, wherein determining the class ID for the data chunk using an accuracy level includes a determining the class ID for the data chunk where the data chunk is within the accuracy level of a representative data chunk assigned to the class ID stored on the storage device.

Statement 66. An embodiment of the inventive concept includes the article according to statement 62, wherein determining the class ID for the data chunk using an accuracy level includes determining a new class ID for the data chunk based at least in part on the data chunk not being within the accuracy level of a second data chunk stored on the storage device associated with an existing class ID.

Statement 67. An embodiment of the inventive concept includes the article according to statement 62, wherein determining the class ID for the data chunk using an accuracy level includes determining the class ID for the data chunk where the data chunk is within the accuracy level of a model data chunk assigned to the class ID.

Statement 68. An embodiment of the inventive concept includes the article according to statement 54, wherein determining a class ID for the data chunk includes:

determining a first class ID for the data chunk using a first classification approach; and determining a second class ID for the data chunk using a second classification approach.

Statement 69. An embodiment of the inventive concept includes the article according to statement 68, wherein:

determining a first class ID for the data chunk using a first classification approach includes determining a first confidence level for the first class ID; and determining a first class ID for the data chunk using a first classification approach includes determining a second confidence level for the second class ID.

Statement 70. An embodiment of the inventive concept includes the article according to statement 69, wherein determining a class ID for the data chunk further includes selecting the first class ID based on the first confidence level being greater than the second confidence level.

Statement 71. An embodiment of the inventive concept includes the article according to statement 54, the non-transitory storage medium having stored thereon further instructions that, when executed by the machine, result in:

storing the data chunk at a Physical Block Address (PBA) in the storage device; and storing a second mapping from the class ID to the PBA.

Statement 72. An embodiment of the inventive concept includes the article according to statement 71, the non-transitory storage medium having stored thereon further instructions that, when executed by the machine, result in returning a result from the storage device to the host that the data chunk was stored on the storage device.

Statement 73. An embodiment of the inventive concept includes the article according to statement 72, wherein:

the method further comprises generating the data ID by the storage device; and returning a result from the storage device to the host that the data chunk was stored on the storage device includes returning the data ID from the storage device to the host.

Statement 74. An embodiment of the inventive concept includes the article according to statement 54, the non-transitory storage medium having stored thereon further instructions that, when executed by the machine, result in returning a result from the storage device to the host without storing the data chunk in the storage device.

Statement 75. An embodiment of the inventive concept includes the article according to statement 54, the non-transitory storage medium having stored thereon further instructions that, when executed by the machine, result in updating a representative data chunk assigned to the class ID based at least in part on the data chunk.

Statement 76. An embodiment of the inventive concept includes the article according to statement 75, wherein updating a representative data chunk assigned to the class ID based at least in part on the data chunk includes applying a persistence policy to update the representative data chunk assigned to the class ID based at least in part on the data chunk.

Statement 77. An embodiment of the inventive concept includes the article according to statement 75, wherein updating a representative data chunk assigned to the class ID based at least in part on the data chunk includes replacing the second data chunk with the data chunk.

Statement 78. An embodiment of the inventive concept includes the article according to statement 75, wherein updating a representative data chunk assigned to the class ID based at least in part on the data chunk includes replacing the second data chunk with a weighted average of the data chunk and the second data chunk.

Statement 79. An embodiment of the inventive concept includes the article according to statement 75, wherein updating a representative data chunk assigned to the class ID based at least in part on the data chunk includes replacing the second data chunk with a centroid of all data chunks represented by the class ID.

Statement 80. An embodiment of the inventive concept includes the article according to statement 54, wherein determining a class identifier (ID) for the data chunk includes determining the class ID for the data chunk using class ID determiner circuitry, the class ID determiner circuitry including at least one of a similarity function, a difference function, a classifier, or a neural network.

Statement 81. An embodiment of the inventive concept includes the article according to statement 54, the non-transitory storage medium having stored thereon further instructions that, when executed by the machine, result in:

receiving a read request from the host at the storage device, the read request including the data ID;

mapping the data ID to the class ID;

mapping the class ID to a PBA;
reading a data at the PBA; and
returning the data to the host from the storage device.

Statement 82. An embodiment of the inventive concept includes the article according to statement 54, the non-transitory storage medium having stored thereon further instructions that, when executed by the machine, result in:

receiving a delete request from the host at the storage device, the read request including the data ID; and
deleting a mapping from the data ID to the class ID.

Statement 83. An embodiment of the inventive concept includes the article according to statement 82, the non-transitory storage medium having stored thereon further instructions that, when executed by the machine, result in:

determining that there is no mapping from a second data ID to the class ID;
deleting a mapping from the class ID to a PBA on the storage device; and
deleting a data at the PBA on the storage device.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A lossy storage device, comprising:
storage for a data;
a host interface to receive a write request from a host at the storage device, the write request including a data chunk and a data identifier (ID);
class ID determiner circuitry to generate a class ID value identifying a class ID from the data chunk, wherein the class ID represents the data chunk; and
a mapping table to map the data ID to the class ID,
wherein the class ID is different from the data ID and a physical address in the storage where the data chunk is stored.

2. The lossy storage device according to claim 1, wherein:
the write request includes a write data; and
the storage device further comprises a data chunk circuitry to divide the write data into the data chunk and a second data chunk using a chunk size.

3. The lossy storage device according to claim 2, wherein the chunk size is associated with one of at least a block size of a block-based storage device or a sector size of a hard disk drive.

4. The lossy storage device according to claim 1, wherein:
an accuracy level is associated with the write request by a machine, the accuracy level representing how similar the data chunk and a representative data chunk for the class ID should be for the data chunk to be assigned to the class ID; and
the class ID determiner circuitry is configured to generate the class ID value identifying the class ID from the data chunk within the accuracy level associated with the write request.

5. The lossy storage device according to claim 1, wherein:
the class ID determiner circuitry determines a first confidence level for the class ID; and
the storage device further comprises a second class ID determiner to generate a second class ID value identifying a second class ID and a second confidence level from the data chunk,
wherein the first confidence level represents a first degree of certainty in the class ID by the class ID determiner circuitry, and
wherein the second confidence level represents a second degree of certainty in the second class ID by the second class ID determiner circuitry.

6. The lossy storage device according to claim 5, further comprising a class ID selector circuitry to select between the class ID and the second class ID using the first confidence level and the second confidence level.

7. The lossy storage device according to claim 1, further comprising a second mapping table to map the class ID to the physical address in the storage, where the data chunk is stored at the physical address in the storage of the storage device.

8. The lossy storage device according to claim 1, wherein:
the storage includes a representative data chunk assigned to the class ID stored at the physical address; and
the storage device further comprises:
a persistence policy; and
an update circuitry to update the representative data chunk to a second representative data chunk assigned to the class ID stored at the physical address using the persistence policy.

9. The storage device according to claim 1, wherein the class ID determiner circuitry is configured to generate a second class ID value identifying the class ID from a second data chunk, wherein the second data chunk is different from the data chunk.

10. The lossy storage device according to claim 1, wherein for each class ID, only one data chunk is stored in the storage.

11. A method, comprising:
receiving a write request from a host at a lossy storage device, the write request including a data chunk;
generating a class identifier (ID) value identifying a class ID from the data chunk; and
storing a mapping from a data ID for the data chunk to the class ID in the lossy storage device,
wherein the class ID represents the data chunk and may be a logical representation of where the data is stored on the lossy storage device,
wherein the class ID is different from the data ID and a physical address in the storage where the data chunk is stored.

12. The method according to claim 11, wherein generating the class ID value identifying the class ID from the data chunk includes generating the class ID value identifying the class ID from the data chunk using an accuracy level associated with the write request, the write request including the accuracy level,
wherein the accuracy level represents how similar the data chunk and a representative data chunk for the class ID should be for the data chunk to be assigned to the class ID.

13. The method according to claim 11, wherein generating the class ID value identifying the class ID from the data chunk includes:
generating a first class ID value identifying a first class ID from the data chunk using a first classification approach; and
generating a second class ID value identifying a second class ID from the data chunk using a second classification approach.

14. The method according to claim 13, wherein:

generating the first class ID value identifying the first class ID from the data chunk using a first classification approach includes determining a first confidence level for the first class ID; and generating the second class ID value identifying the second class ID from the data chunk using a second classification approach includes determining a second confidence level for the second class ID, wherein the first confidence level represents a first degree of certainty in the class ID by the class ID determiner circuitry, and wherein the second confidence level represents a second degree of certainty in the second class ID by the second class ID determiner circuitry.

15. The method according to claim 14, wherein generating the class ID value identifying the class ID from the data chunk further includes selecting the first class ID based on the first confidence level being greater than the second confidence level.

16. The method according to claim 11, further comprising:

storing the data chunk at the physical address in the lossy storage device; and storing a second mapping from the class ID to the physical address.

17. The method according to claim 11, wherein generating the class ID value identifying the class ID from the data chunk includes generating the class ID value identifying the class ID from the data chunk using a class ID determiner circuitry, the class ID determiner circuitry including at least one of a similarity function, a difference function, a classifier, or a neural network.

18. The method according to claim 11, further comprising:

receiving a read request from the host at the lossy storage device, the read request including the data ID;

mapping the data ID to the class ID;

mapping the class ID to the physical address;

reading a data at the physical address; and returning the data to the host from the lossy storage device.

19. The method according to claim 11, further comprising:

receiving a delete request from the host at the lossy storage device, the delete request including the data ID; and deleting a mapping from the data ID to the class ID.

20. The method according to claim 19, further comprising:

determining that there is no mapping from a second data ID to the class ID;

deleting a mapping from the class ID to the physical address on the lossy storage device; and deleting a data at the physical address on the lossy storage device.

21. An article, comprising a non-transitory storage medium, the non-transitory storage medium having stored thereon instructions that, when executed by a machine, result in:

receiving a write request from a host at a lossy storage device, the write request including a data chunk;

generating a class identifier (ID) value identifying a class ID from the data chunk; and storing a mapping from a data ID for the data chunk to the class ID in the lossy storage device, wherein the class ID represents the data chunk and may be a logical representation of where the data is stored on the lossy storage device, wherein the class ID is different from the data ID and a physical address in the storage where the data chunk is stored.

22. The article according to claim 21, the non-transitory storage medium having stored thereon further instructions that, when executed by the machine, result in:

storing the data chunk at the physical address in the lossy storage device; and storing a second mapping from the class ID to the physical address.

* * * * *